(12) United States Patent
Baror et al.

(10) Patent No.: US 11,843,718 B2
(45) Date of Patent: *Dec. 12, 2023

(54) AUTOMATIC NAVIGATION OF AN INTERACTIVE VOICE RESPONSE (IVR) TREE ON BEHALF OF HUMAN USER(S)

(71) Applicant: GOOGLE LLC, Mountain View, CA (US)

(72) Inventors: Yuval Baror, Mountain View, CA (US); Michael Andrew Goodman, Oakland, CA (US); Yoav Tzur, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,201

(22) Filed: Mar. 9, 2022

(65) Prior Publication Data

US 2022/0201119 A1 Jun. 23, 2022

Related U.S. Application Data

(63) Continuation of application No. 17/068,511, filed on Oct. 12, 2020, now Pat. No. 11,303,749.

(Continued)

(51) Int. Cl.
*H04M 3/493* (2006.01)
*G06F 16/901* (2019.01)
*H04M 3/51* (2006.01)

(52) U.S. Cl.
CPC ...... *H04M 3/4936* (2013.01); *G06F 16/9027* (2019.01); *H04M 3/5166* (2013.01)

(58) Field of Classification Search
None
See application file for complete search history.

(56) References Cited

U.S. PATENT DOCUMENTS 5,815,566 A 9/1998 Ramot et al.
6,061,433 A * 5/2000 Polcyn .................. H04M 3/50
379/93.12

(Continued)

FOREIGN PATENT DOCUMENTS

CN 103795877 5/2014
CN 105592237 5/2016

(Continued)

OTHER PUBLICATIONS

European Patent Office; International Search Report and Written Opinion of Serial No. PCT/US2020/064918; 24 pages; dated Jul. 28, 2021.

(Continued)

*Primary Examiner* — Hemant S Patel
(74) *Attorney, Agent, or Firm* — Gray Ice Higdon

(57) ABSTRACT

Implementations are directed to utilizing an assistant to automatically navigate an interactive voice response (IVR) tree to arrive at a target state during an assisted telephone call. The assistant can receive input to initiate the assisted telephone call, identify an entity to engage with, on behalf of the user, and during the assisted telephone call, based on the input, and identify an IVR tree stored in association with the entity. In various implementations, navigation of the IVR tree can be modified based on interaction(s) detected at a client device subsequent to initiating the assisted telephone call. In various implementations, the assisted telephone call can be initiated from a search interface, and the target state can be associated with a given search result. In various implementations, the IVR tree can be dynamic in that only a subset of candidate state(s) of the IVR tree may be available as the target state.

14 Claims, 18 Drawing Sheets

Related U.S. Application Data

(60) Provisional application No. 63/088,178, filed on Oct. 6, 2020.

(56) References Cited

U.S. PATENT DOCUMENTS

| | | | |
|---|---|---|---|
| 6,304,653 | B1 | 10/2001 | O'Neil et al. |
| 6,377,567 | B1 | 4/2002 | Leonard |
| 6,418,199 | B1 * | 7/2002 | Perrone ............... H04M 3/4938 704/275 |
| 6,731,725 | B1 | 5/2004 | Merwin et al. |
| 6,922,465 | B1 | 7/2005 | Howe |
| 7,084,758 | B1 | 8/2006 | Cole |
| 7,337,158 | B2 | 2/2008 | Fratkina et al. |
| 7,539,656 | B2 | 5/2009 | Fratkina et al. |
| 7,792,773 | B2 | 9/2010 | McCord et al. |
| 7,920,678 | B2 | 4/2011 | Cooper et al. |
| 8,345,835 | B1 | 1/2013 | Or-Bach et al. |
| 8,594,308 | B2 | 11/2013 | Soundar |
| 8,938,058 | B2 | 1/2015 | Soundar |
| 8,964,963 | B2 | 2/2015 | Soundar |
| 9,001,819 | B1 * | 4/2015 | Or-Bach ............ H04L 65/4015 370/352 |
| 9,098,551 | B1 * | 8/2015 | Fryz ..................... G06F 16/951 |
| 9,232,369 | B1 | 1/2016 | Fujisaki |
| 9,318,108 | B2 | 4/2016 | Gruber et al. |
| 9,467,566 | B2 | 10/2016 | Soundar |
| 9,473,637 | B1 | 10/2016 | Venkatapathy et al. |
| 9,721,570 | B1 | 8/2017 | Beal et al. |
| 10,447,860 | B1 | 10/2019 | Hartman et al. |
| 11,303,749 | B1 * | 4/2022 | Baror .................. H04M 3/4936 |
| 2002/0051522 | A1 | 5/2002 | Merrow et al. |
| 2002/0055975 | A1 | 5/2002 | Petrovykh |
| 2003/0009530 | A1 | 1/2003 | Philonenko et al. |
| 2003/0063732 | A1 | 4/2003 | Mcknight |
| 2004/0001575 | A1 | 1/2004 | Tang |
| 2004/0083195 | A1 | 4/2004 | McCord et al. |
| 2004/0213384 | A1 | 10/2004 | Alles et al. |
| 2004/0240642 | A1 | 12/2004 | Crandell et al. |
| 2005/0147227 | A1 | 7/2005 | Chervirala et al. |
| 2005/0175168 | A1 | 8/2005 | Summe et al. |
| 2005/0271250 | A1 | 12/2005 | Vallone et al. |
| 2006/0039365 | A1 | 2/2006 | Ravikumar et al. |
| 2006/0056600 | A1 | 3/2006 | Merrow et al. |
| 2006/0215824 | A1 | 9/2006 | Mitby et al. |
| 2007/0036320 | A1 | 2/2007 | Mandalia et al. |
| 2007/0201664 | A1 | 8/2007 | Salafia |
| 2008/0181371 | A1 | 7/2008 | Merrow et al. |
| 2008/0209449 | A1 | 8/2008 | Maehira |
| 2008/0309449 | A1 | 12/2008 | Martin et al. |
| 2009/0022293 | A1 | 1/2009 | Routt |
| 2009/0029674 | A1 | 1/2009 | Brezina et al. |
| 2009/0089096 | A1 | 4/2009 | Schoenberg |
| 2009/0089100 | A1 | 4/2009 | Nenov et al. |
| 2009/0137278 | A1 | 5/2009 | Haru et al. |
| 2009/0154666 | A1 | 6/2009 | Rios et al. |
| 2009/0232295 | A1 | 9/2009 | Ryskamp |
| 2010/0088613 | A1 | 4/2010 | DeLuca et al. |
| 2010/0104087 | A1 | 4/2010 | Byrd et al. |
| 2010/0124325 | A1 | 5/2010 | Weng et al. |
| 2010/0228590 | A1 | 9/2010 | Muller et al. |
| 2010/0272246 | A1 | 10/2010 | Malik et al. |
| 2011/0092187 | A1 | 4/2011 | Miller |
| 2011/0270687 | A1 | 11/2011 | Bazaz |
| 2012/0016678 | A1 | 1/2012 | Gruber et al. |
| 2012/0109759 | A1 | 5/2012 | Oren et al. |
| 2012/0147762 | A1 | 6/2012 | Hancock et al. |
| 2012/0157067 | A1 | 6/2012 | Turner et al. |
| 2012/0173243 | A1 | 7/2012 | Anand et al. |
| 2012/0271676 | A1 | 10/2012 | Aravamudan et al. |
| 2013/0060587 | A1 | 3/2013 | Bayrak et al. |
| 2013/0077772 | A1 | 3/2013 | Lichorowic et al. |
| 2013/0090098 | A1 | 4/2013 | Gidwani |
| 2013/0136248 | A1 | 5/2013 | Kaiser-Nyman et al. |
| 2013/0163741 | A1 | 6/2013 | Balasaygun et al. |
| 2013/0275164 | A1 | 10/2013 | Gruber et al. |
| 2014/0024362 | A1 | 1/2014 | Kang et al. |
| 2014/0029734 | A1 | 1/2014 | Kim et al. |
| 2014/0037084 | A1 | 2/2014 | Dutta |
| 2014/0107476 | A1 | 4/2014 | Tung et al. |
| 2014/0122077 | A1 | 5/2014 | Nishikawa et al. |
| 2014/0122618 | A1 | 5/2014 | Duan |
| 2014/0200928 | A1 | 7/2014 | Watanabe et al. |
| 2014/0207882 | A1 | 7/2014 | Joo et al. |
| 2014/0247933 | A1 | 9/2014 | Soundar |
| 2014/0279050 | A1 | 9/2014 | Makar et al. |
| 2014/0280464 | A1 | 9/2014 | De Ding et al. |
| 2014/0310365 | A1 | 10/2014 | Sample et al. |
| 2015/0139413 | A1 | 5/2015 | Hewitt et al. |
| 2015/0142704 | A1 | 5/2015 | London |
| 2015/0150019 | A1 | 5/2015 | Sheaffer et al. |
| 2015/0237203 | A1 | 8/2015 | Siminoff |
| 2015/0248817 | A1 | 9/2015 | Steir et al. |
| 2015/0281446 | A1 | 10/2015 | Milstein et al. |
| 2015/0339707 | A1 | 11/2015 | Harrison et al. |
| 2015/0347399 | A1 | 12/2015 | Aue et al. |
| 2015/0350331 | A1 | 12/2015 | Kumar |
| 2015/0358790 | A1 | 12/2015 | Nasserbakht |
| 2016/0028891 | A1 | 1/2016 | Pirat et al. |
| 2016/0105546 | A1 | 4/2016 | Keys et al. |
| 2016/0139998 | A1 | 5/2016 | Dunn et al. |
| 2016/0198045 | A1 | 7/2016 | Kulkarni et al. |
| 2016/0227033 | A1 | 8/2016 | Song |
| 2016/0227034 | A1 | 8/2016 | Kulkarni et al. |
| 2016/0277569 | A1 | 9/2016 | Shine et al. |
| 2016/0379230 | A1 | 12/2016 | Chen |
| 2017/0037084 | A1 | 2/2017 | Fasan |
| 2017/0039194 | A1 | 2/2017 | Tschetter |
| 2017/0061091 | A1 | 3/2017 | McElhinney et al. |
| 2017/0094052 | A1 | 3/2017 | Zhang et al. |
| 2017/0177298 | A1 | 6/2017 | Hardee et al. |
| 2017/0180499 | A1 | 6/2017 | Gelfenbeyn et al. |
| 2017/0289332 | A1 | 10/2017 | Lavian et al. |
| 2017/0358296 | A1 | 12/2017 | Segalis et al. |
| 2017/0359463 | A1 | 12/2017 | Segalis et al. |
| 2017/0359464 | A1 | 12/2017 | Segalis et al. |
| 2017/0365277 | A1 | 12/2017 | Park |
| 2018/0124241 | A1 | 5/2018 | Vijaywargi et al. |
| 2018/0124255 | A1 | 5/2018 | Kawamura et al. |
| 2018/0133900 | A1 | 5/2018 | Breazeal et al. |
| 2018/0220000 | A1 | 8/2018 | Segalis et al. |
| 2018/0227416 | A1 | 8/2018 | Segalis et al. |
| 2018/0227417 | A1 | 8/2018 | Segalis et al. |
| 2018/0227418 | A1 | 8/2018 | Segalis et al. |
| 2018/0255178 | A1 | 9/2018 | Deng et al. |
| 2018/0316630 | A1 | 11/2018 | Jacobson |
| 2019/0281159 | A1 | 9/2019 | Segalis et al. |
| 2019/0306314 | A1 | 10/2019 | Segalis et al. |
| 2020/0042597 | A1 | 2/2020 | Wu |
| 2020/0314246 | A1 | 10/2020 | Hart |

FOREIGN PATENT DOCUMENTS

| | | |
|---|---|---|
| EP | 1679693 | 7/2006 |
| JP | 2004508748 | 3/2004 |
| JP | 2007219385 | 8/2007 |
| JP | 2007524928 | 8/2007 |
| JP | 2008015439 | 1/2008 |
| JP | 2009210703 | 9/2009 |
| JP | 2015070371 | 2/2015 |
| KR | 20130099423 | 9/2013 |
| KR | 20140121105 | 10/2014 |
| WO | 2007065193 | 6/2007 |

OTHER PUBLICATIONS

European Patent Office; Invitation to Pay Additional Fees; Serial No. PCT/US2020/064918; 13 pages; dated Jun. 7, 2021.

Leviathan, Yaniv et al. Google Duplex: An AI System for Accomplishing Real-World Tasks Over the Phone, Google AI Blog; 7 pages; dated May 8, 2018.

(56) References Cited

OTHER PUBLICATIONS

Intellectual Property India; First Examination Report issued in Application No. 202227062864; 10 pages; dated Oct. 9, 2023.

* cited by examiner

AUTOMATIC NAVIGATION OF AN INTERACTIVE VOICE RESPONSE (IVR) TREE ON BEHALF OF HUMAN USER(S)

BACKGROUND

Automated assistants can be interacted with by a user via a variety of computing devices, such as smart phones, tablet computers, wearable devices, automobile systems, stand-alone personal assistant devices, and so forth. The automated assistants receive input from the user (e.g., spoken, touch, and/or typed) and respond with responsive output (e.g., visual and/or audible).

A user can interact with an automated assistant to cause the automated assistant to perform action(s) on behalf of the user. As one example, the automated assistant can navigate interactive voice response (IVR) systems, can place telephone calls on behalf of the user to perform a given action, and can engage in a dialog with an additional user to perform the action(s). For instance, a user can provide user input that requests the automated assistant make a restaurant reservation over the phone and on behalf of the user. The automated assistant can initiate a telephone call with a particular restaurant, and can navigate an IVR system associated with the particular restaurant to make the reservation, and/or can provide reservation information to an additional human associated with the particular restaurant to make the reservation. The automated assistant can then notify the user when a human associated with the particular restaurant is an active participant of the telephone call, notify the user whether the restaurant reservation was successfully made on behalf of the user during the telephone call, and/or cause the user to join the telephone call.

SUMMARY

Implementations disclosed herein are directed to using an automated assistant to perform an assisted telephone call, with an entity, and on behalf of a given user, to navigate an interactive voice response (IVR) tree of an IVR system associated with the entity. The IVR tree of an IVR system associated with the entity can be stored in database(s) accessible at a client device of the given user. Performing the assisted telephone call to navigate the IVR tree can include automatically navigating the IVR tree to a target state of the IVR tree. The target state of the IVR tree can be determined, from among a plurality of based on user input detected at the client device of the given user. The automated assistant can automatically navigate the IVR tree to the target state of the IVR tree by instance(s) of synthesized speech can be rendered as part of the assisted telephone call which can include injecting the synthesized speech or human speech into the assisted telephone such that the synthesized speech or human speech is audibly perceptible to the IVR system (but not necessarily the given user), and/or instance(s) of emulated button presses can be rendered as part of the assisted telephone call which can include injecting the emulated button presses into the call so that it is perceivable by the IVR system. The synthesized speech, human speech, and/or emulated button presses can be determined based on corresponding value(s) for parameter(s) associated with navigating the IVR tree to the target state. The parameter(s) can be stored in association with the IVR tree associated with the entity, and the corresponding value(s) for the parameters can be retrieved from database(s) and/or solicited from the given user of the client device. In some implementations, the automated assistant can cause the client device to render a notification that requests the user of the client device joins the assisted telephone call. In some additional or alternative implementations, the automated assistant can optionally perform task(s) on behalf of the user subsequent to automatically navigating the IVR tree to the target state. For example, the automated assistant can engage in a dialog with a human representative associated with the entity to perform the task(s) on behalf of the user.

Some implementations are directed to modifying navigation of the IVR tree based on user interactions detected at the client device subsequent to initiating the assisted telephone call. The automated assistant can generate and render prompt(s) related to modifying navigation of the IVR tree, and can determine whether to modify the navigation of the IVR tree based on user input received in response to the prompt(s). In some versions of those implementations, modifying navigation of the IVR tree may include modifying the target state to an alternative target state or adding an additional target state to be navigated to subsequent to navigating to the target state. For example, assume the automated assistant is navigating to a target state associated with a painting department of an IVR tree associated with a home improvement entity. In this example, if the given user interacts with a home and gardening section of a webpage associated with the home improvement entity, then the user may be prompted to additionally or alternatively navigate to a target state associated with the home and gardening department of the IVR tree associated with the home improvement entity. In some additional and/or alternative versions of those implementations, modifying navigation of the IVR tree may include modifying the corresponding value(s) for the parameter(s) associated with navigating the IVR tree to the target state. Continuing with the above example, if the given user interacts with a webpage associated with a particular brand of paint, then the user may be prompted to utilize a corresponding value associated with the particular brand of paint for a paint brand parameter. In these and other manners, client device resource(s) and/or network resource(s) can be preserved by preventing the re-launching of another assisted telephone call that is performed with respect to an alternative target state and/or alternative value(s) for navigating the IVR tree. Further, the assisted telephone call can conclude more quickly, thereby lessening the overall duration that computer and/or network resources are utilized in performing the assisted telephone call. Moreover, battery resources of the client device may also be preserved in that the given user is not an active participant in the assisted telephone call, and the client device may be placed in a locked or low-power state during the assisted telephone call.

Some additional or alternative implementations are directed to providing IVR deeplinks to candidate state(s) of the IVR tree along with search results that are received responsive to a search query determined based on user input. In some versions of those implementations, a given IVR deeplink can be provided based on recent user interactions at the client device prior to issuing of the search query. For example, assume the user of the client device is interacting with search results related to reporting lost baggage to an airlines entity, and then issues a search for the airline entity. In this example, the automated assistant can cause an IVR deeplink associated with a target state of reporting lost baggage to be provided for selection by the given user of the client device based on the recent user interactions (and optionally more prominently than other IVR deeplinks that may also be provided). In some additional and/or alternative versions of those implementations, a given IVR deeplink can be provided based term(s) the search query. For example, assume the given user of the client issues a search query of "report lost baggage to Example Airlines". In this example, the automated assistant can cause an IVR deeplink associated with a target state of reporting lost baggage to be provided for selection by the given user of the client device based on the term(s) of the search query including "report lost baggage" and "Example Airlines". In these and other manners, a quantity of user inputs can be reduced, thereby client device resource(s) may be preserved since the given user need only select the "IVR deeplink". Further, the assisted telephone call can conclude more quickly, thereby lessening the overall duration that computer and/or network resources are utilized in performing the assisted telephone call. Moreover, battery resources of the client device may also be preserved in that the given user is not an active participant in the assisted telephone call, and the client device may be placed in a locked or low-power state during the assisted telephone call.

Some additional or alternative implementations are directed to determining availability of candidate states based on contextual information associated with the client device of the given user and/or contextual information associated with the given user of the client device. The contextual information associated with the client device can include, for example, device state information (e.g., on state, off state, locked state, sleep state), date and/or time information associated with a current location of the client device, the current location of the client device, and/or other contextual information generated by the client device. For example, candidate states associated with a restaurant entity may include a carryout candidate state and a delivery candidate state if the restaurant entity is open. However, the candidate states associated with the restaurant entity may not include a carryout candidate state or a delivery candidate state if the restaurant entity is closed, or may not include the delivery candidate state if the client device is located beyond a delivery radius even if the restaurant is open. Further, the contextual information associated with the given user of the client device can include, for example, electronic communication(s) created by the user of the client device or received by the user of the client device, user account information associated with various user accounts of the given user of the client device, pecuniary information of the given user of the client device, photo album(s) of the given user of the client device, social media profile(s) of the given user of the client device, user preference(s) of the user of the client device, personal information of the given user of the client device, and/or other information associated with the given user of the client device. For example, candidate states associated with a hotel entity may include a contact concierge state or request free upgrade state if the given user is a gold status member or above at the hotel entity. However, if the given user is not a gold status member or above at the hotel entity, the candidate states may omit these states. In these and other manners, client device resource(s) and/or network resource(s) can be preserved by preventing the re-launching of another assisted telephone call that is performed with respect to the given user selecting a candidate state that may be unavailable. Further, the assisted telephone call can conclude more quickly, thereby lessening the overall duration that computer and/or network resources are utilized in performing the assisted telephone call. Moreover, battery resources of the client device may also be preserved in that the given user is not an active participant in the assisted telephone call, and the client device may be placed in a locked or low-power state during the assisted telephone call.

Some additional or alternative implementations are directed to rendering the candidate states in various manners based on a confidence level for the IVR tree associated with the entity. The confidence level for the IVR tree stored in association with the entity may be based on a quantity of assisted telephone calls with the entity that include navigating the IVR tree that is different from the IVR tree stored in association with the entity, and optionally based on an extent of the difference between the navigated IVR tree and the stored IVR tree. For example, if the confidence level for the IVR tree satisfies a first threshold that indicates the automated assistant is highly confident in the IVR tree associated with the entity, then the automated assistant can cause a sequence of button presses to be rendered at the client device to notify the given user of the client device how to quickly navigate the IVR tree to one or more of the candidate states prior to initiating the assisted telephone call or upon initiating the assisted telephone call (e.g., press "1", "3", "5" to report lost baggage), or the automated assistant can cause selectable graphical element(s) (that may not match the sequence of button presses) associated with the candidate state(s) to be rendered at the client device and that, when selected, cause the automated assistant to automatically navigate to a target state associated with the selected selectable graphical element prior to initiating the assisted telephone call or upon initiating the assisted telephone call (e.g., press "5" to report lost baggage). As another example, if the confidence level for the IVR tree fails to satisfy the first threshold, but satisfies a second threshold, that indicates the automated assistant is mildly confident in the IVR tree associated with the entity, then the automated assistant can cause the aforementioned selectable graphical element(s) (that may not match the sequence of button presses) associated with the candidate state(s) to be rendered at the client device and only when a portion of the IVR tree that the automated assistant is mildly confidence in is traversed. As yet another example, if the confidence level for the IVR tree fails to satisfy the first threshold and the second threshold, that indicates the automated assistant is not confident in the IVR tree associated with the entity, then the automated assistant can cause the aforementioned selectable graphical element(s) (that may not match the sequence of button presses) associated with the candidate state(s) to be rendered at the client device after the automated assistant perceives the options for the IVR tree. In these and other manners, client device resource(s) and/or network resource(s) can be preserved by preventing the re-launching of another assisted telephone call in the case that the automated assistant provided incorrect information to the user for navigating the IVR tree. Further, the assisted telephone call can conclude more quickly, thereby lessening the overall duration that computer and/or network resources are utilized in performing the assisted telephone call by providing the sequence of button presses or selectable elements associated with the candidate states. Moreover, battery resources of the client device may also be preserved in that the given user is not an active participant in the assisted telephone call, and the client device may be placed in a locked or low-power state during the assisted telephone call.

The above description is provided as an overview of only some implementations disclosed herein. Those implementations, and other implementations, are described in additional detail herein.

DETAILED DESCRIPTION

Figure 1:
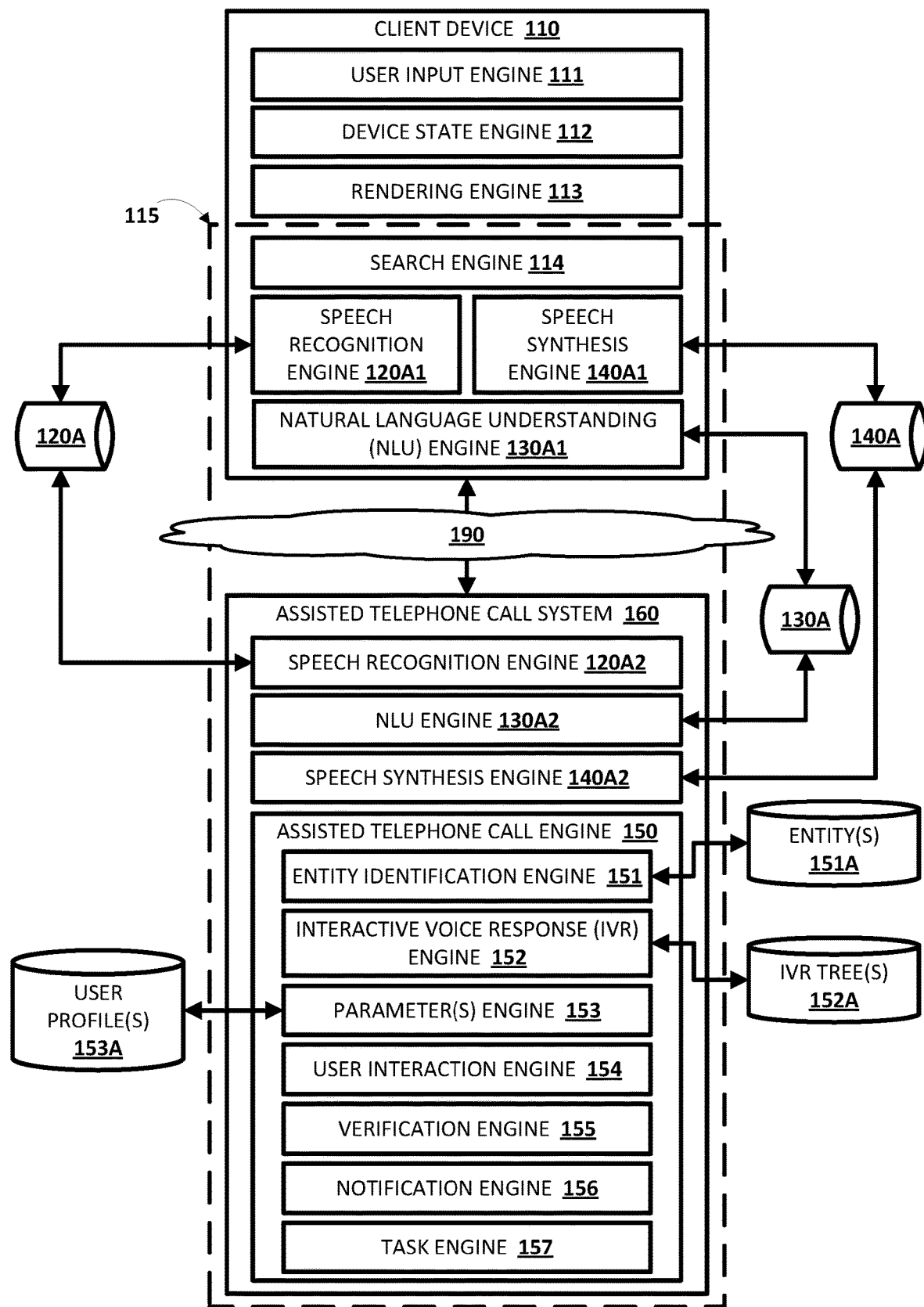
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 111, device state engine 112, rendering engine 113, search engine 114, speech recognition engine 120A1, natural language understanding ("NW") engine 130A1, and speech synthesis engine 140A1.

The user input engine 111 can detect various types of user input at the client device 110. The user input detected at the client device 110 can include spoken input detected via microphone(s) of the client device 110 and/or additional spoken input transmitted to the client device 110 from an additional client device, of an additional user that is associated with an entity, during an assisted telephone call, touch input detected via a user interface input device (e.g., touchscreen) of the client device 110, and/or typed input detected via a user interface input device (e.g., via a virtual keyboard on a touchscreen) of the client device 110. The additional user that is associated with the entity can be, for example, an additional human participant associated with an additional client device, an additional automated assistant associated with the additional client device of the additional user, and/or other additional users.

The assisted telephone calls described herein can be performed using various voice communication protocols (e.g., Voice over Internet Protocol (VoIP), public switched telephone networks (PSTN), and/or other telephonic communication protocols. As described herein, synthesized speech can be rendered as part of an assisted telephone call, which can include injecting the synthesized speech into the call so that it is perceivable by at least one of the participants of the assisted telephone call. As also described herein, emulated button presses can be rendered as part of the assisted telephone call, which can include injecting the emulated button presses into the call so that it is perceivable by at least one of the participants of the assisted telephone call. The synthesized speech can be generated and/or injected by the client device 110 that is one of the endpoints of the call and/or can be generated and/or injected by a server that is in communication with the client device 100, and is also connected to the assisted telephone call. As also described herein, audible output can also be rendered outside of the assisted telephone call, which does not include injecting the audible output into the call, although the audible output could be detected by a microphone of the client device 110 connected to the assisted telephone call and, as a result, perceivable on the call. In some implementations, the assisted telephone call can optionally be muted and/or filtering can be utilized to mitigate perceiving, in the assisted telephone call, of the audible output rendered outside of the assisted telephone call.

In various implementations, an automated assistant 115 (generally indicated by dashed lines in FIG. 1) can execute an assisted telephone call at the client device 110 over network(s) 190 (e.g., Wi-Fi, Bluetooth, near-field communication, local area network(s), wide area network(s), and/or other networks) using assisted telephone call system 160. The assisted telephone call system 160 includes, in various implementations, speech recognition engine 120A2, NLU engine 130A2, speech synthesis engine 140A2, and assisted telephone call engine 150. In some implementations, the automated assistant 115 can utilize the assisted telephone call system 160 to navigate an interactive voice response (IVR) tree of an IVR system that is associated with an entity, and on behalf of a user of the client device 110, during an assisted telephone call with an additional user. In some additional or alternative implementations, the automated assistant 115 can utilize the assisted telephone call system 160 to perform task(s), on behalf of the user of the client device 110, during an assisted telephone call with an additional user. In some additional or alternative implementations, the automated assistant 115 can utilize the assisted telephone call system 160 to navigate non-interactive systems (e.g., an on-hold system, a voicemail system) and/or recognize if an IVR system is malfunctioning or nothing is happening during the assistant telephone call (and optionally terminate the assisted telephone call and notify the user).

Moreover, in some implementations, subsequent to navigating the IVR tree and prior to performing any task(s) on behalf of a user of the client device 110, the automated assistant 115 can obtain consent from an additional user to engage in a dialog with the automated assistant 115. For example, the automated assistant 115 can obtain consent upon connecting with a human participant to process audio data corresponding to speech of the human participant. If the automated assistant 115 obtains consent from the additional user, then the automated assistant 115 can verify a target state of the IVR tree has been reached (e.g., as described below with respect to verification engine 155), and/or can perform the task(s) on behalf of the user (e.g., as described below with respect to task engine 157). However, if the automated assistant 115 does not obtain consent from the additional user, then the automated assistant 115 can cause the client device 110 to render a notification to the user of the client device 110 (e.g., using rendering engine 113) indicating that the user needs to take over the assisted telephone call and/or terminate the assisted telephone call and render a notification to the user of the client device 110 (e.g., using rendering engine 113).

As described in detail below, the automated assistant 115 can execute an assisted telephone call using the assisted telephone call system 160 in response to detecting user input, from the user of the client device 110, to initiate a telephone call using the automated assistant 115. In some implementations, the automated assistant 115 can determine a target state, from among a plurality of candidate states, for navigation of an IVR tree that is associated with an entity to engage with, on behalf of the user of the client device 110 and during the assisted telephone call, based on user input received at the client device 110. In some versions of those implementations, the automated assistant 115 can receive a selection of the target state prior to initiating of the assisted telephone call or upon the assisted telephone call being initiated. In some additional or alternative versions of those implementations, the automated assistant 115 can receive a sequence of selections that result in the target state prior to initiating of the assisted telephone call or upon the assisted telephone call being initiated. The automated assistant 115 can navigate the IVR tree until arriving at the target state, and can cause a notification that the automated assistant 115 has arrived at the target state to be rendered at the client device 110 (e.g., using the rendering engine 113). In various implementations, the automated assistant 115 can additionally perform task(s) on behalf of the user upon arriving at the target state, and can cause a notification that includes a result of performance of the task(s) to be rendered at the client device 110 (e.g., using the rendering engine 113).

As shown in FIG. 1, the assisted telephone call system 160 can be implemented remotely (e.g., via server(s) and/or other remote client device(s)) and in communication with the client device 110. Although the assisted telephone call system 160 is shown in FIG. 1 as being implemented remotely over the network(s) 190 and in communication with the client device 110, it should be understood that that is for sake of example and is not meant to be limiting. For example, in various implementations, the assisted telephone call system 160 can be implemented locally on the client device 110. As another example, in various implementations, the assisted telephone call system 160 can be implemented remotely at the assistant telephone call system 160 without any connection to the client device 110 (e.g., a cloud-based assisted telephone call), and the client device 110 may optionally be in an off state or not connected to any networks (e.g., determined using the device state engine 112). Moreover, although the automated assistant 115 is shown in FIG. 1 as being implemented both locally on the client device 110 and remotely at the assisted telephone call system 160, it should be understood that is also for the sake of example and is not meant to be limiting. For example, in various implementations, the automated assistant 115 can be implemented locally on the client device 110, whereas in other implementations, the automated assistant 115 can be implemented locally on the client device 110 and interact with a separate, cloud-based automated assistant (e.g., forming a logical instance of the automated assistant 115).

In implementations when the user input engine 111 detects spoken input of a user via microphone(s) of the client device 110 and/or receives audio data capturing additional spoken input, from an additional user, transmitted to the client device 110 from an additional client device (e.g., during an assisted telephone call), the speech recognition engine 120A1 of the client device 110 can process, using speech recognition model(s) 120A, the audio data that captures the spoken input and/or that captures the additional spoken input. The speech recognition engine 120A1 can generate recognized text corresponding to the spoken input and/or the additional spoken input based on the processing of the audio data. Further, the NLU engine 130A1 of the client device 110 can process, using NLU model(s) 130A, the recognized text generated by the speech recognition engine 120A1 to determine intent(s) included in the spoken input and/or the additional spoken input. For example, if the client device 110 detects spoken input of "call Hypothetical Airline to report lost luggage" from the user, the client device 110 can process, using the speech recognition model(s) 120A, audio data that captures the spoken input to generate recognized text corresponding to the spoken input of "call Hypothetical Airline to report lost luggage", and can process, using the NLU model(s) 130A, the recognized text to determine at least a first intent of initiating a call and a second intent of reporting lost luggage. As another example, if the client device 110 detects additional spoken input of "tell us briefly why you are calling", then the client device 110 can process, using the speech recognition model(s) 120A, audio data that captures the additional spoken input to generate recognized text corresponding to the additional spoken input of "tell us briefly why you are calling", and can process, using the NLU model(s) 130A, the recognized text to determine an intent of requesting natural language input that includes a request for information associated with why the assisted telephone call was initiated (e.g., to report lost luggage). In some versions of those implementations, the client device 110 can transmit the audio data, the recognized text, and/or the intent(s) to the assisted telephone call system 160.

In other implementations, when the user input engine 111 detects spoken input of a user via microphone(s) of the client device 110 and/or receives audio data capturing additional spoken input, from an additional user, transmitted to the client device 110 from an additional client device (e.g., during an assisted telephone call and/or during an ongoing call), the automated assistant 115 can cause the client device 110 to transmit the audio data that captures the spoken input and/or the additional spoken input to the assisted telephone call system 160. The speech recognition engine 120A2 and/or the NLU engine 130A2 of the assisted telephone call system 160 can process the audio data that captures the spoken input and/or the audio data that captures the additional spoken utterance in similar manner described above with respect to the speech recognition engine 120A1 and/or the NLU engine 130A1 of the client device 110. In some additional and/or alternative implementations, the speech recognition engine 120A1 and/or the NLU engine 130A1 of the client device 110 can be used in the conjunction with the speech recognition engine 120A2 and/or the NLU engine 130A2 of the assisted telephone call system 160 in a distributed manner. Moreover, the speech recognition model(s) 120A and/or the NLU model(s) 130A can be stored locally on the client device 110 and/or remotely at server(s) in communication with the client device 110 and/or the assisted telephone call system 160 over the network(s) 190.

In various implementations, the speech recognition model(s) 120A are end-to-end speech recognition model(s), such that the speech recognition engine(s) 120A1 and/or 120A2 can generate recognized text corresponding to spoken input directly using the model. For instance, the speech recognition model(s) 120A can be end-to-end model(s) used to generate the recognized text on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. In other implementations, the speech recognition model(s) 120A are not end-to-end speech recognition model(s) such that the speech recognition engine(s) 120A1 and/or 120A2 can instead generate predicted phoneme(s) (and/or other representations). For instance, the predicted phoneme(s) (and/or other representations) may then be utilized by the speech recognition engine(s) 120A1 and/or 120A2 to determine recognized text that conforms to the predicted phoneme(s). In doing so, the speech recognition engine(s) 120A1 and/or 120A2 can optionally employ a decoding graph, a lexicon, and/or other resource(s).

In implementations when the user input engine 111 detects touch and/or typed input via a user interface input device of the client device 110, the automated assistant 115 can cause an indication of the touch input and/or an indication the typed input to be transmitted from the client device 110 to the assisted telephone call system 160. In some versions of those implementations, the indication of the touch input and/or the indication the typed input can include underlying text or representations of the touch input and/or text of the typed input, and the underlying text the speech recognition model(s) 120A are end-to-end speech recognition model(s) can be processed, using the NLU model(s) 130A, to determine intent(s) for the underlying text and/or the text.

As described herein, the assisted telephone call engine 150 of the assisted telephone call system 160 can further process the recognized text generated by the speech recognition engine(s) 120A1 and/or 120A2, the underlying text or representations of touch input detected at the client device 110, the underlying text of typed input detected at the client device 110, and/or the intent(s) determined by the NLU engine(s) 130A1 and/or 130A2. The assisted telephone call engine 150 includes, in various implementations, entity identification engine 151, interactive voice response (IVR) engine 152, parameter(s) engine 153, user interaction engine 154, verification engine 155, notification engine 156, and task performance engine 157.

The entity identification engine 151 can identify an entity to engage with, on behalf of the user of the client device 110. The entity can be, for example, a person entity, a business entity, a location entity, and/or other entities. For example, a person entity can be a friend entity, a family member entity, a co-worker entity, and/or other particular types of person entities. Further, a business entity can be a restaurant entity, an airline entity, a hotel entity, a salon entity, a doctor's office entity, and/or other particular types of business entities. Moreover, a location entity can be a school entity, a museum entity, a library entity, a park entity, and/or other particular types of location entities. In some implementations, the entity identifying engine 151 can also determine a specific entity for the identified entity. For example, a specific entity for a person entity can be a name of the person (e.g., Jane Doe, John Doe etc.), a specific entity for a business entity can be a name of the business (e.g., Hypothetical Airlines, Example Airlines, etc.), and a specific entity for a location entity can be a name of the location (e.g., Hypothetical University, Example National Park, etc.). Although the entities described herein can be defined by various levels of granularity, they are collectively referred to herein as "entity" for the sake of simplicity.

In some implementations, the entity identification engine 151 can identify the entity to engage with, on behalf of the user of the client device 110, based on user interaction(s) with the client device 110, prior to initiating an assisted telephone call using the automated assistant 115. In some versions of those implementations, the entity can be identified responsive to receiving the user input to initiate the assisted telephone call. For instance, if the user of the client device 110 directs input (e.g., spoken or touch) to a call interface element of a software application (e.g., associated with a contact in a contacts application, associated with a search result in a browser application, and/or associated with other callable entities included in other software applications), then the entity identification engine 151 can identify an entity associated with the call interface element. For example, if user input is directed to a call interface element associated with "Hypothetical Airlines" in a browser application, then the entity identification engine 151 can identify "Hypothetical Airlines" (or more generally a business entity or restaurant entity) as the entity to engage with, on behalf of the user of the client device 110, during the assisted telephone call.

Moreover, the entity identification engine 151 can identify the entity, from among a plurality of entities, that are stored in entity(s) database 151A. In some implementations, the plurality of entities stored in entity(s) database 151A can be indexed by entity and/or particular types of entities. For example, if the entity identification engine 151 identifies the entity "Hypothetical Airlines", then "Hypothetical Airlines" can be indexed in the entity(s) database 151A as a business entity, and can optionally be further indexed as an airlines entity. By storing and indexing identified entities in the entity(s) database 151A, the entity identification engine 151 can easily identify and retrieve entities, thereby reducing subsequent processing to identify entities as they are encountered in future assisted telephone calls. Moreover, in various implementations, each entity can be associated with task(s) in the entity(s) database 151A.

The IVR engine 152 can identify an IVR tree (and optionally audio data associated with the IVR tree) that is associated with an entity that is identified via the entity identification engine 151. In some implementations, the IVR tree that is associated with the identified entity can be stored in association with the identified entity in IVR tree(s) database 152A. For example, IVR trees stored in the IVR tree(s) database 152A can be mapped to corresponding entities stored in the entity(s) database 151A. In some additional or alternative implementations, the IVR trees can be stored in association with the corresponding entities in the entity(s) database 151A, and the IVR tree(s) database 152A may be omitted. Each of the IVR trees can include a plurality of corresponding candidate states, and the automated assistant 115 can determine a target state of a given IVR tree, from among the plurality of corresponding candidate states, based on user input that is detected via the user input engine 111. During the assisted telephone call, the automated assistant can automatically navigate the IVR tree to the target state.

In some implementations, and prior to receiving user input to initiate the assisted telephone call, the automated assistant 115 (and/or additional instances of the automated assistant) may initiate automated telephone calls with a plurality of entities stored in the entity(s) database 151A. During these automated telephone calls, the automated assistant 115 (and/or the additional instances of the automated assistant) can navigate an IVR system associated with the entity to map out corresponding IVR trees associated with each of the plurality of entities, and the mapping of the corresponding IVR trees can be stored in the IVR tree(s) database 152A. In some versions of those implementations, the automated assistant 115 (and/or additional instances of the automated assistant) may initiate multiple automated telephone calls to a given entity, of the plurality of entities, to map variations of a given IVR tree that is associated with the given entity. For example, the automated assistant 115 may initiate a first automated telephone call with a restaurant entity when the restaurant entity is open, and may initiate a second automated telephone call with the restaurant entity when the restaurant is closed. In other words, the IVR engine 152 can cause the automated assistant 115 to map the given IVR tree associated with the restaurant entity in different contexts (e.g., contexts associated with a given client device or contexts associated with a user) to determine whether the given IVR tree is dynamic. As a result, when the IVR tree 152 identifies the IVR tree that is associated with the entity, an IVR tree that matches a current context of the client device 110 and/or the user of the client device 110 can be identified (e.g., as described with respect to FIGS. 7 and 8A-8D). In some additional or alternative implementations, and prior to receiving user input to initiate the assisted telephone call, an entity can provide a representation of an IVR tree and the IVR tree can be stored in the IVR tree(s) database 152A.

In various implementations, the automated assistant 115 can track changes of an IVR tree over time based on assisted telephone calls initiated in response to user input to initiate the assisted telephone calls, and optionally an extent of the changes. These changes can be identified based on differences in states between a stored IVR tree and an IVR tree that is currently being navigated by the automated assistant 115 and/or stored audio data that is associated with the IVR tree and audio data associated with the IVR tree that is currently being navigated by the automated assistant 115. For example, if the automated assistant 115 determines an IVR tree that is associated with a given entity and that is traversed during an assisted telephone call differs from the IVR tree stored in the IVR tree(s) database 152A (e.g., the IVR tree being currently navigated includes a new introduction message, different internal nodes or lead nodes, etc.), then the automated assistant 115 can store the different states of the IVR tree currently being navigated along with the IVR tree already stored in association with the given entity in the IVR tree(s) database 152A. Further, the inclusion of the new introduction message can be utilized as a signal to the automated assistant 115 that the IVR tree may include other downstream changes, and monitor for those changes rather than immediately trying to navigate the IVR tree (if possible). As a result, the automated assistant 115 may. As another example, if the automated assistant 115 determines that audio data received during navigation of the IVR differs from audio data stored in association with the IVR tree (e.g., based on comparing acoustic features of the received audio data and the stored audio data and/or comparing recognized text corresponding to the received audio data and the stored audio data), then the automated assistant 115 can store the different audio data of the IVR tree currently being navigated along with the IVR tree already stored in association with the given entity in the IVR tree(s) database 152A. If the differences between the stored IVR tree and the navigated IVR tree persist for a threshold quantity of assisted telephone calls with the given entity, then the different IVR tree may replace the IVR tree that is associated with the given entity. In some versions of those implementations, the different IVR tree may only be considered for replacing the IVR tree if it is encountered in the same context (e.g., determined based on contextual information associated with the client device 110 and/or the user of the client device 110). In some versions of those implementations, a confidence level associated with an IVR tree that is associated with a given entity may be based on how often the IVR tree traversed during the assisted telephone call matches the IVR tree stored in association with the IVR tree in the IVR tree(s) database 152A. In some further versions of those implementations, and as described with respect to FIGS. 6B-6E, the automated assistant 115 can render the plurality of candidate states in different manners based on the confidence level and whether the confidence level satisfies one or more thresholds.

In some implementations, the parameter(s) engine 153 can identify parameter(s) associated with navigating the IVR tree that is identified via the IVR engine 152 based on the entity identified via the entity identification engine 151. The parameter(s) for the IVR tree can be stored in association with the IVR tree that is identified via the IVR engine 152, and can vary based on a navigation path for navigating the IVR tree to the target state. The automated assistant 115 can navigate the IVR tree using corresponding value(s) for the parameter(s). In some implementations, the corresponding value(s) for the parameter(s) can be stored in the user profile(s) database 153A, and the automated assistant 115 can retrieve the corresponding value(s) for the parameter(s) from the user profile(s) database 153A responsive to identifying the parameter(s) associated with navigating the IVR tree and without soliciting any value(s) from the user of the client device 110. In some additional or alternative versions of those implementations, the automated assistant 115 can cause the corresponding value(s) for the parameter(s) to be solicited from the user responsive to identifying parameter(s) associated with navigating the IVR tree and responsive to determining the corresponding value(s) cannot be retrieved from the user profile(s) database 153A. For example, the automated assistant 115 can initiate a dialog with the user of the client device, and cause one or more prompts to be rendered at the client device 110, via the rendering engine 113, to solicit the corresponding value(s) for any parameter(s) that cannot be resolved using information from the user profile(s) database 153A.

The user profile(s) database 153A can include information about the user from various sources including, for example, electronic communications associated with the user of the client device 110 (e.g., emails, text messages, voice messages, and so on), user account information associated with various user accounts of the user of the client device 110 (e.g., account status information, account numbers, account user names, account passwords, and so on), application information from applications installed on the client device 110 and/or accessible by the client device 110 (e.g., a smart device application, a notes application, a reminders application, a phone application, a calendar application, and/or other software applications), payment information of the user of the client device 110 (e.g., bank account number, credit card number, payment application information, etc.), photo albums of the user of the client device 110, social media profile(s) of the user of the client device 110, user preferences of the user of the client device 110, personal information of the user of the client device 110 (e.g., name, phone number, physical address, email address, social security number, date of birth, and so on), and/or other access-restricted information. For example, for navigating an IVR tree associated with an airline entity to a target state associated with cancelling a flight reservation, the parameter(s) engine 153 can identify parameters for canceling the flight reservation, and can determine values for the parameters. For instance, a flight confirmation number parameter can be identified and the flight confirmation number can be retrieved from a flight confirmation email, a frequent flier number parameter can be identified and the frequent flier number for the user of the client device 110 that is associated with the airline for which the flight is being cancelled can be retrieved from an application associated with the airline. In contrast, for navigating the IVR tree associated with the airline entity to a different target state associated with changing a flight reservation, the parameter(s) engine 153 can the above parameters and corresponding values, but may also identify a date or time parameter for a new flight and a destination parameter for the new flight, and corresponding values for those parameters may be solicited form the user of the client device 110.

Figure 2:
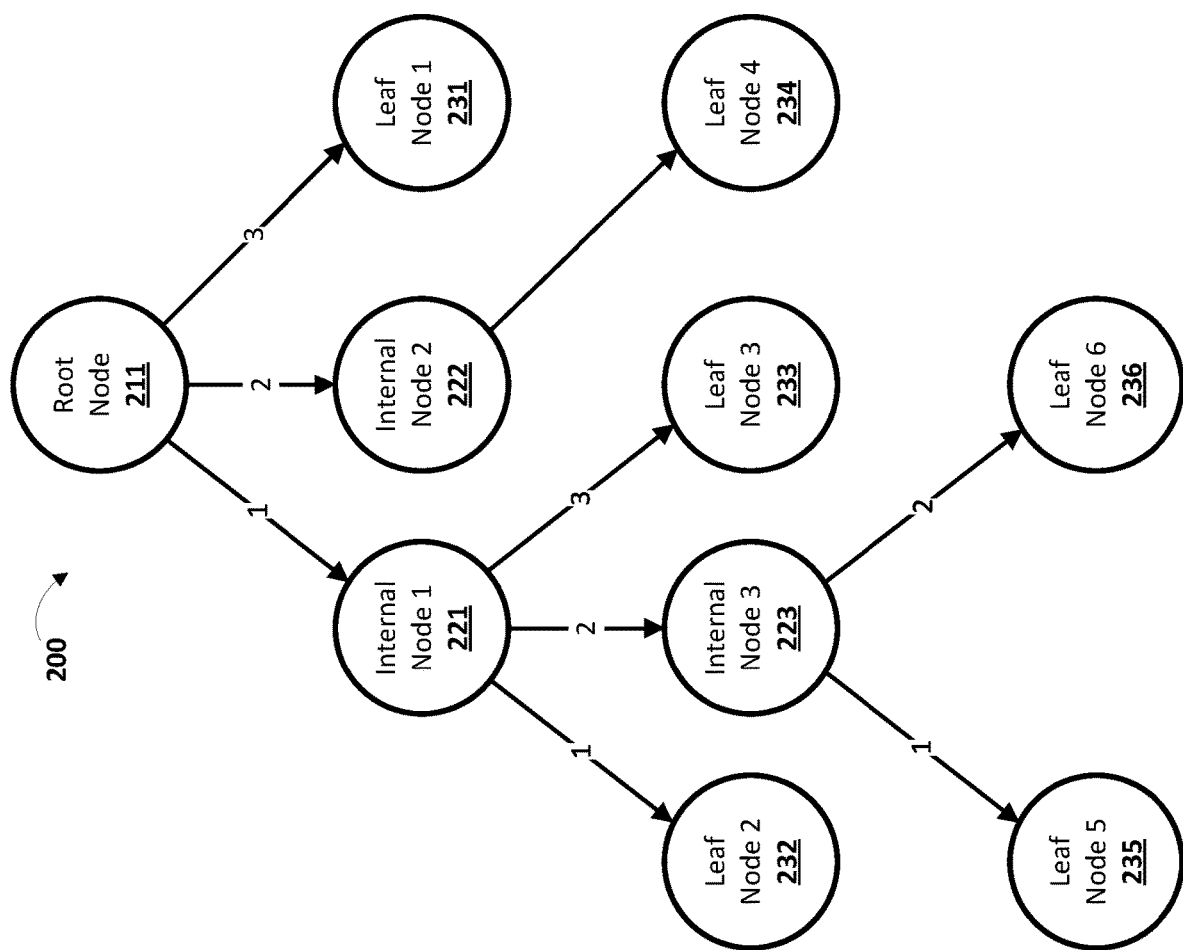
FIG. 2 depicts an example interactive voice response (IVR) tree, in accordance with various implementations.

For example, referring briefly to FIG. 2, an example IVR tree 200 is depicted. The IVR tree 200 depicted in FIG. 2 includes a plurality of nodes that are connected by a plurality of edges. The plurality of nodes can include for example, at least one root node and at least one leaf node. For example, as shown in FIG. 2, the IVR tree includes a root node 211, a plurality of internal nodes 221, 222, and 223, and a plurality of leaf nodes 231, 232, 233, 234, 235, and 236. The leaf nodes 231, 232, 233, 234, 235, and 236 can correspond to the plurality of candidate states, and a given one of leaf nodes 231, 232, 233, 234, 235, and 236 can correspond to the target state. Notably, the plurality of nodes are connected by a plurality of corresponding edges. These nodes and/or edges can be stored as the IVR tree in the IVR tree(s) database 152A (and optionally along with audio data associated with each of the nodes and/or edges). Each of the corresponding edges can be traversed based on input generated by the automated assistant 115 during the assisted telephone call. For example, the corresponding edges can be traversed based on input corresponding to a numerical indicator that can be emulated as a button press by the automated assistant 115 (e.g., press "1" to traverse from root node 211 to internal node 1 221, press "2" to traverse from root node 211 to internal node 2 222, press "3" to traverse from root node 211 to leaf node 1 231, and so on as indicated by the edges in FIG. 2), or based on input corresponding to free-form natural language input (e.g., say "book a flight" to traverse from root node 211 to internal node 1 221, and so on).

In some implementations, the free-form natural language input can be synthesized speech audio data generated by the automated assistant 115 that includes synthesized speech to be rendered at an additional client device to traverse along the edges of the IVR tree. For example, the automated assistant can generate synthesized speech audio data that includes an indication of the numerical indicator described above and/or a short summary of why the assisted telephone call was placed. In some additional or alternative implementations, the free-form natural language input can be audio data that captures spoken input of the user of the client device 110 and that is provided prior to initiating the assisted telephone call and/or during the assisted telephone call. For example, if the IVR tree requires that the user provide spoken utterance to verify an identity of the user of the client device 110 (e.g., using voice identification), then the audio data can capture the spoken input of the user.

In various implementations, the automated assistant 115 can track navigation of the IVR tree 200. By tracking navigation of the IVR tree 200, the automated assistant 115 can determine when to provide input (e.g., synthesized speech, emulated button presses, and/or audio data) to navigate the IVR tree 200. For example, the automated assistant 115 can track initiating of the assisted telephone call beginning at the root node 211, and begin traversing the along the edges of the IVR tree 200 to the internal nodes 221, 222, and 223 and/or the leaf nodes 231, 232, 233, 234, 235, and 236 to navigate the IVR tree 200 to a target state determined based on user input detected at the client device 110. As the automated assistant 115 traverses along the edges to the different nodes to arrive at the target state, the edges and/or the nodes traversed can be tracked by the automated assistant 115. In this example, if the IVR tree 200 includes an introduction message prior to presenting a main menu associated with the root node 211, then the automated assistant 115 can determine the introduction message is new and withhold any input to navigate the IVR tree until the main menu associated with the root node 211 is presented (or any other changes are presented). As another example, the automated assistant 115 can determine that any input to be provided to navigate the IVR tree to the target state may not be provided until the IVR system provides all of the options for navigating the IVR tree (e.g., the IVR tree does not support providing of input at any time). In this example, the automated assistant 115 may withhold any input to navigate the IVR tree until all of the options for navigating the IVR tree are presented. In some implementations, the automated assistant 115 may return to previous nodes that were traversed during navigation of the IVR tree 200.

As one non-limiting example, assume the IVR tree 200 corresponds to an IVR tree that is associated with a hypothetical entity—Example Airlines. In this example, the root node 211 may correspond to a main menu of an IVR system that is associated with Example Airlines, the internal nodes may correspond to intermediate states 221, 222, and 223, and the leaf nodes 231, 232, 233, 234, 235, and 236 may correspond to target states for the IVR tree. Further assume that leaf node 1 231 is associated with a target state of "speak with a representative", leaf node 2 232 is associated with a target state of "upcoming flight information", leaf node 3 233 is associated with a target state of "report lost baggage", leaf node 4 234 is associated with a target state of "book a flight", leaf node 5 235 is associated with a target state of "change flight reservation", and leaf node 6 236 is associated with a target state of "cancel flight reservation". In some implementations, the target state to which the automated assistant 115 navigates the IVR tree to during the assisted telephone call can be determined based on user input detected via the user input engine 111 of the client device 110 prior to initiating the assisted telephone call and/or during the assisted telephone call.

For instance, assume that user input is received at the client device 110 that indicates the user wants to report lost baggage. In this example, the automated assistant 115 can determine to navigate to leaf node 3 233 that is associated with a target state of "report lost baggage". In this example, the automated assistant 115 may know to traverse from root node 211 to internal node 1 221, and to traverse from internal node 1 221 to leaf node 3 233 to report the lost baggage, since the IVR tree 200 was previously mapped by the automated assistant 115 (and/or additional automated assistants) as described above with respect to the IVR engine 152. In navigating from root node 211 to leaf node 3 233 and/or upon arriving at leaf node 3 233, the automated assistant 115 can cause corresponding value(s) for parameter(s) requested while navigating the IVR tree 200 to be rendered at an additional client device associated with the entity. In this example, the automated assistant 115 can render corresponding value(s) for flight information associated with a recent flight (e.g., flight confirmation number, departing destination, arriving destination), personal information of the user of the client device 110 (e.g., name and phone number), and/or other corresponding value(s) for parameter(s) at the additional client device associated with the entity in response to the corresponding value(s) for the parameter(s) being requested. Upon arriving at leaf node 3 233, the automated assistant 115 can optionally generate a notification (e.g., via the notification engine 156) to be rendered at the client device 110 (e.g., via the rendering engine 113) that requests the user join the assisted telephone call and/or alerts the user of the client device 110 of a result of reporting the lost baggage.

As another instance, assume that user input is received at the client device 110 that indicates the user wants to cancel a lost reservation. In this example, the automated assistant 115 can determine to navigate to leaf node 6 236 that is associated with a target state of "report lost baggage". In this example, the automated assistant 115 may know to traverse from root node 211 to internal node 1 221, to traverse from internal node 1 221 to internal node 3 223, and to traverse from internal node 3 223 to leaf node 6 236 to cancel the flight reservation, since the IVR tree 200 was previously mapped by the automated assistant 115 (and/or additional automated assistants) as described above with respect to the IVR engine 152. In navigating from root node 211 to leaf node 6 236 and/or upon arriving at leaf node 6 236, the automated assistant 115 can cause corresponding value(s) for parameter(s) requested while navigating the IVR tree 200 to be rendered at an additional client device associated with the entity. In this example, the automated assistant 115 can render corresponding value(s) for flight information associated with an upcoming flight (e.g., flight confirmation number, departing destination, arriving destination), account information associated with an Example Airlines account (e.g., a frequent flier number), and/or other corresponding value(s) for parameter(s) at the additional client device associated with the entity in response to the corresponding value(s) for the parameter(s) being requested. Upon arriving at leaf node 6 236, the automated assistant 115 can optionally generate a notification (e.g., via the notification engine 156) to be rendered at the client device 110 (e.g., via the rendering engine 113) that requests the user join the assisted telephone call and/or alerts the user of the client device 110 of a result of cancelling the flight.

Although the IVR tree 200 of FIG. 2 is depicted as having particular nodes configured it a particular manner based on the corresponding edges, it should be understood that is for the sake of example and is not meant to be limiting, and it should be understood that the IVR tree can be configured in virtually limitless different ways. Moreover, some nodes of the IVR tree 200 may or may not be available to the user of the client device 110 based on certain contexts (e.g., as described with respect to FIGS. 7 and 8A-8D). For example, assume a given IVR tree is associated with a restaurant entity. In this example, a target state associated with placing a carry out order may be available when the restaurant entity is opened. In contrast, the target state associated with placing the carry out order may not be available when the restaurant entity is closed.

Referring back to FIG. 1, the user interaction engine 154 can detect user interactions at the client device 110. The user interactions can include, for example, a search interaction with a web browser or web browser application, a browsing interaction with the web browser or the web browser application, a navigation interaction with the web browser or a navigation application, an assistant interaction with the automated assistant 115, and/or other user interactions. In some implementations, the user interaction engine 154 can detect user interactions, of the user of the client device 110, at the client device 110, or at an additional client device in communication with the client device 110 (e.g., over networks 190), subsequent to the automated assistant 115 initiating performance of the assisted telephone call. In some versions of those implementations, the automated assistant 115 may determine whether the detected user interaction is associated with the entity engaged with, on behalf of the user of the client device 110, during the assisted telephone call. If the automated assistant 115 determines the detected user interaction is associated with the entity, the automated assistant 115 may generate one or more prompts (e.g., via the notification engine 156) asking the user of the client device 110 whether navigation of the IVR tree should be modified. In some further versions of those implementations, modifying navigation of the IVR tree may include navigating to a different target state. For example, if the automated assistant 115 initiates an assisted telephone call to navigate an IVR tree associated with a home improvement entity to navigate the IVR tree to a target state associated with a painting department of the home improvement entity, and the user of the client device 110 subsequently interacts with a webpage associated with a home and garden department of the home improvement entity, then the automated assistant 115 may generate one or more prompts asking the user whether to additionally or alternatively navigate to a target state associated with the home and garden department. In other further versions of those implementations, modifying navigation of the IVR tree may include navigating to the same IVR tree with different parameters. For example, if the automated assistant 115 initiates an assisted telephone call to navigate an IVR tree associated with a home improvement entity to navigate the IVR tree to a target state associated with a painting department of the home improvement entity, and the user of the client device 110 subsequently interacts with a webpage associated with a particular paint manufacturer, then the automated assistant 115 may generate one or more prompts asking the user whether to utilize the particular paint manufacturer as a corresponding value for parameter in navigating to the target state associated with the paint department. Modifying navigation of the IVR tree is described in detail below (e.g., with respect to FIGS. 3 and 4A-4C).

In some additional or alternative implementations, the user interaction engine 154 can detect user interactions, of the user of the client device 110, at the client device 110, or at an additional client device in communication with the client device 110 (e.g., over networks 190), prior to the automated assistant 115 initiating performance of the assisted telephone call. In some versions of those implementations, the automated assistant 115 may identify an entity associated with the user interaction, and may cause the candidate states of the IVR tree to be rendered based on the user interaction if an assisted telephone call is subsequently initiated with the identified entity. For example, if a user is navigating a webpage associated with a hypothetical airlines entity—Example Airlines—researching how to report lost baggage prior to initiating an assisted telephone call with Example Airlines, the automated assistant 115 may render a selectable graphical element associated with a target state associated with reporting lost baggage (alone or more prominently than other selectable elements) for an IVR tree that is associated with Example Airlines. In other words, the automated assistant 115 can cause the selectable graphical element to be rendered as an "IVR deeplink" to the target state of the IVR tree based on the user researching how to report lost baggage prior to initiating an assisted telephone call (e.g., as described with respect to FIGS. 5 and 6A).

In some implementations, the verification engine 155 can verify whether a state navigated to by the automated assistant 115 during the assisted telephone call is in fact the target state. In some versions of those implementations, upon a human representative associated with the entity joining the assisted telephone call, the automated assistant 115 can process received audio data that captures spoken input of the human representative to verify the state navigated to by the automated assistant 115 is in fact the target state. For example, assume the automated assistant 115 is navigating an IVR tree associated with a home improvement entity to a target state associated with a painting department of the home improvement entity. Further assume the human representative takes over the assisted telephone call from the IVR system associated with the home improvement entity, and provides spoken input of "Thanks for calling the paint department, how can I help today?" In this example, the verification engine 155 can cause the automated assistant 115 to process audio data that captures the spoken input using the speech recognition engine 120A1 and/or 120A2, and can determine the spoken input includes "paint department" based on processing the audio data that captures the spoken input. In some additional or alternative versions of those implementations, the spoken input may be received responsive to synthesized speech audio data that includes synthesized speech to verify the target state of navigating the IVR tree. Continuing with the above example, assume the human representative takes over the assisted telephone call from the IVR system associated with the home improvement entity, and provides spoken input of "Hello." In this example, the verification engine 155 can cause the automated assistant 115 to render synthesized speech of "Hello, is this the paint department?" at an additional client device associated with the human representative. The verification engine 155 can cause the automated assistant 115 to process audio data that captures spoken input that is responsive to the synthesized speech using the speech recognition engine 120A1 and/or 120A2, and can determine whether the spoken input verifies that the target state was reached (e.g., "yes", "this is the paint department", or some other affirmation).

In various implementations, if the state arrived upon in navigating the IVR does not correspond to the target state, then the verification engine 155 can cause the automated assistant 115 to render synthesized speech at the additional client device associated with the human representative requesting that the assisted telephone call be transferred to the target state. Continuing with the above example, if it is determined that the spoken input indicates the automated assistant 115 arrived at a state associated with a home and garden department (rather than the paint department), the verification engine 155 can cause the automated assistant 115 to render synthesized speech of "Can you transfer me to the paint department?" at the additional client device associated with the human representative, and can again verify the state, subsequent to the transfer, corresponds to the desired target state of the user of the client device 110.

The notification engine 156 can generate various notifications based on navigating the IVR tree associated with the identified entity and/or based on task(s) performed by the automated assistant 115, and on behalf of the user of the client device 110, during the assisted telephone call and without suspending the assisted telephone call. For example, the automated assistant 115 can cause the notification engine 156 to generate a notification that requests the user of the client device 110 join the assisted telephone call upon arriving at the target state. In some implementations, the notification engine 156 may only cause the automated assistant 115 to generate the notification that requests the user of the client device 110 join the assisted telephone call subsequent to the verification engine 155 verifying that the automated assistant has in fact arrived at the target state as described above with respect to the verification engine 155. As another example, if the automated assistant 115 cannot resolve corresponding value(s) for parameter(s) during the assisted telephone, the automated assistant 115 can cause the notification engine 156 to generate one or more prompts to solicit the corresponding value(s) for any unresolved parameter(s) needed to continue navigating the IVR tree that is associated with the entity. As yet another example, if the automated assistant performs a task, on behalf of the user of the client device 110, during the assisted telephone call, then the automated assistant 115 can cause the notification engine 156 to generate a notification that includes a result of performance of the task.

In some implementations, a type of the notification generated by the notification engine 157 and rendered at the client device 110 via the rendering engine 113, and/or one or more properties of rendering the notification (e.g., volume, brightness, size) can be based on a state of the client device 110 (e.g., determined using device state engine 112) and/or a state of an ongoing assisted telephone call. The state of the ongoing assisted telephone call can be based on, for example, software application(s) operating in the foreground of the client device 110, software application(s) operating in the background of the client device 110, whether the client device 110 is in a locked state, whether the client device 110 is in a sleep state, whether the client device 110 is an off state, sensor data generated by sensor(s) of the client device 110, and/or other data associated with the client device 110. For example, if a state of the client device 110 indicates that a software application (e.g., an automated assistant application, a phone application, an assisted telephone call application, and/or other software applications) displaying a transcription of the assisted telephone call is operating in a foreground of the client device 110, then the type of notification may be a banner notification, a pop-up notification, and/or other types of visual notifications. As another example, if a state of the client device 110 indicates that the client device 110 is in a sleep or locked state, then the type of notification may be an audible indication via speaker(s) and/or a vibration via the speaker(s) or other hardware components of the client device 110 that mimics a telephone call. As yet another example, if sensor data from presence sensor(s), accelerometer(s), and/or other sensor(s) of the client device indicate that the user is not currently near and/or currently holding the client device, then a more intrusive notification can be provided (e.g., visual and audible at a first volume level). On the other hand, if such sensor data indicates that the user is currently near and/or currently holding the client device, then a less intrusive notification can be provided (e.g., visual only, or visual and audible at a second volume level that is lesser than the first volume level). As yet another example, a more intrusive notification can be provided when the state of the dialog indicates that the dialog is near completion, while a less intrusive notification can be provided when the state of the dialog indicates that the dialog is not near completion.

Moreover, in implementations where the automated assistant 115 causes a notification to be rendered at the client device 110 that requests the user joins the assisted telephone call, but the user does not join the assisted telephone call within a threshold duration of time (e.g., 15 seconds, 30 seconds, 60 seconds, and/or other durations of time), the automated assistant can cause the assisted telephone call to be terminated. In some versions of those implementations, the threshold duration of time can begin when the notification requesting the user to join the assisted telephone call is rendered at the client device 110. In some additional or alternative versions of those implementations, and prior to terminating the assisted telephone call, a state of the assisted telephone call can be stored in one or more databases of the client device 110 (e.g., random-access memory of the client device). If the user of the client device 110 subsequently interacts with the notification to join the assisted telephone call that was terminated, the automated assistant 115 can re-initiate performance of the assisted telephone call by loading the stored state of the assisted telephone call, such that the assisted telephone call is resumed at a given state that corresponds to the stored state of the assisted telephone call. In this manner, the automated assistant 115 need not navigate portions of the IVR tree that have already been navigated by the automated assistant 115.

In various implementations, and subsequent to automated assistant 115 navigating to the target state of an IVR tree that is associated with an entity, the automated assistant can perform a task, on behalf of the user of the client device 110. In some versions of those implementations, the task engine 157 can determine task(s) to be performed on behalf of a user of the client device 110 based on the user input detected at the client device 110 to initiate the assisted telephone call, or based on additional user input detected at the client device 110 prior to the automated assistant 115 initiating the assisted telephone call. For example, if the user of the client device 110 provides spoken input of "call Example Café to make a reservation for tonight", then the task engine 157 can utilize intent(s) of initiating a call and making a restaurant reservation (e.g., determined using NLU model(s) 130A) to determine a task of making a restaurant reservation based on the spoken input. The parameter(s) described herein that are determined by the parameter(s) engine 153 can also identify parameter(s) for the task identified by the task engine 157, and determine the corresponding value(s) for the parameter(s) for the task in a similar manner described above with respect to the parameter(s) engine 153.

The task engine 157 can cause the automated assistant 115 to engage in a dialog, with a human representative that is associated with the identified entity during the assisted telephone call to perform the task. For example, the task engine 157 can provide text and/or phonemes, that are based on the corresponding value(s) for the parameter(s), to the speech synthesis engine 140A1 and/or 140A2 to generate synthesized speech audio data. The synthesized speech audio data can be transmitted to the additional client device of the human representative for audible rendering at the additional client device. For example, the speech synthesis engine(s) 140A1 and/or 140A2 can determine a sequence of phonemes determined to correspond to value(s) for parameter(s) requested by the human representative, and can process the sequence of phonemes using the speech synthesis model(s) 140A, to generate synthesized speech audio data. The synthesized speech audio data can be, for example, in the form of an audio waveform. In determining a sequence of phonemes that correspond to the value(s) for the parameter(s), the speech synthesis engine(s) 140A1 and/or 140A2 can access a tokens-to-phonemes mapping stored locally at the client device 110 or stored at server(s) (e.g., over network(s) 190). The task engine 157 can cause the speech recognition engine 120A1 and/or 120A2 to process any audio data that captures spoken input provided by the human representative, and the automated assistant 115 can then generate further synthesized speech audio data using the speech synthesis engine 140A1 and/or 140A2

As described herein, the rendering engine 113 can render various notifications or other output at the client device 110. The rendering engine 113 can render the various notifications described herein audibly and/or visually. Moreover, the rendering engine 113 can cause a transcript of dialog to be rendered on a user interface of the client device 110. In some implementations, the transcript can correspond to a dialog between the user of the client device 110 and the automated assistant 115. In some additional or alternative implementations, the transcript can correspond to a dialog between the IVR system that is associated with the identified entity and the automated assistant 115. In yet other implementations, the transcript can correspond to a dialog between a human representative that is associated with the identified entity and the automated assistant 115.

In some implementations, the user input detected at the client device 110 via the user input engine 111 can be a search query received via a search interface of the client device 110. The search interface can be, for example, implemented as part of a phone or contacts application, a browser application, an automated assistant application, a web-based browser, and/or any other interface that enables search functionality. The search engine 114 can identify and retrieve search results that are rendered at the client device 110 via the rendering engine 113. In some versions of those implementations, the search results can include content that is responsive to the search query, and can optionally include one or more selectable elements. The one or more selectable elements can include, for example, a deeplink to one or more candidate states of an IVR tree that is associated with an entity and that, when selected based on additional user input (e.g., touch, typed, and/or spoken), causes the automated assistant 115 to navigate to a target state of the IVR tree that corresponds to the selected candidate state of the IVR tree included in the search results. For example, if the user of the client device 110 submits a search query of "home improvement store" via a search interface of a phone application, selectable elements associated with various departments corresponding to the one or more of the candidate states, of an IVR tree associated with the home improvement store, can be included in the search results that are responsive to the search query. Moreover, a particular selectable element (e.g., "paint department") may be rendered more prominently than other selectable elements if the user recently interacted with other search results associated with "paint" (e.g., as described above with respect to the user interaction engine 154).

By using the techniques described herein, various technical advantages can be achieved. As one non-limiting example, the automated assistant 115 can more quickly conclude an assisted telephone call since the automated assistant need not hear options of the IVR system prior to navigating the IVR tree since it is stored in association with the entity. Both network and computational resources can be conserved since a length of the assisted telephone call can be reduced by using the techniques disclosed herein. Further, a quantity of user inputs can be reduced, thereby client device resource(s) may be preserved since the given user may only need to select the "IVR deeplink" in various implementations to initiate performance of the assisted telephone call. Moreover, battery resources of the client device 110 may also be preserved in that the user is not an active participant in the assisted telephone call, and the client device 110 may be placed in a locked or low-power state during the assisted telephone call.

Figure 3:
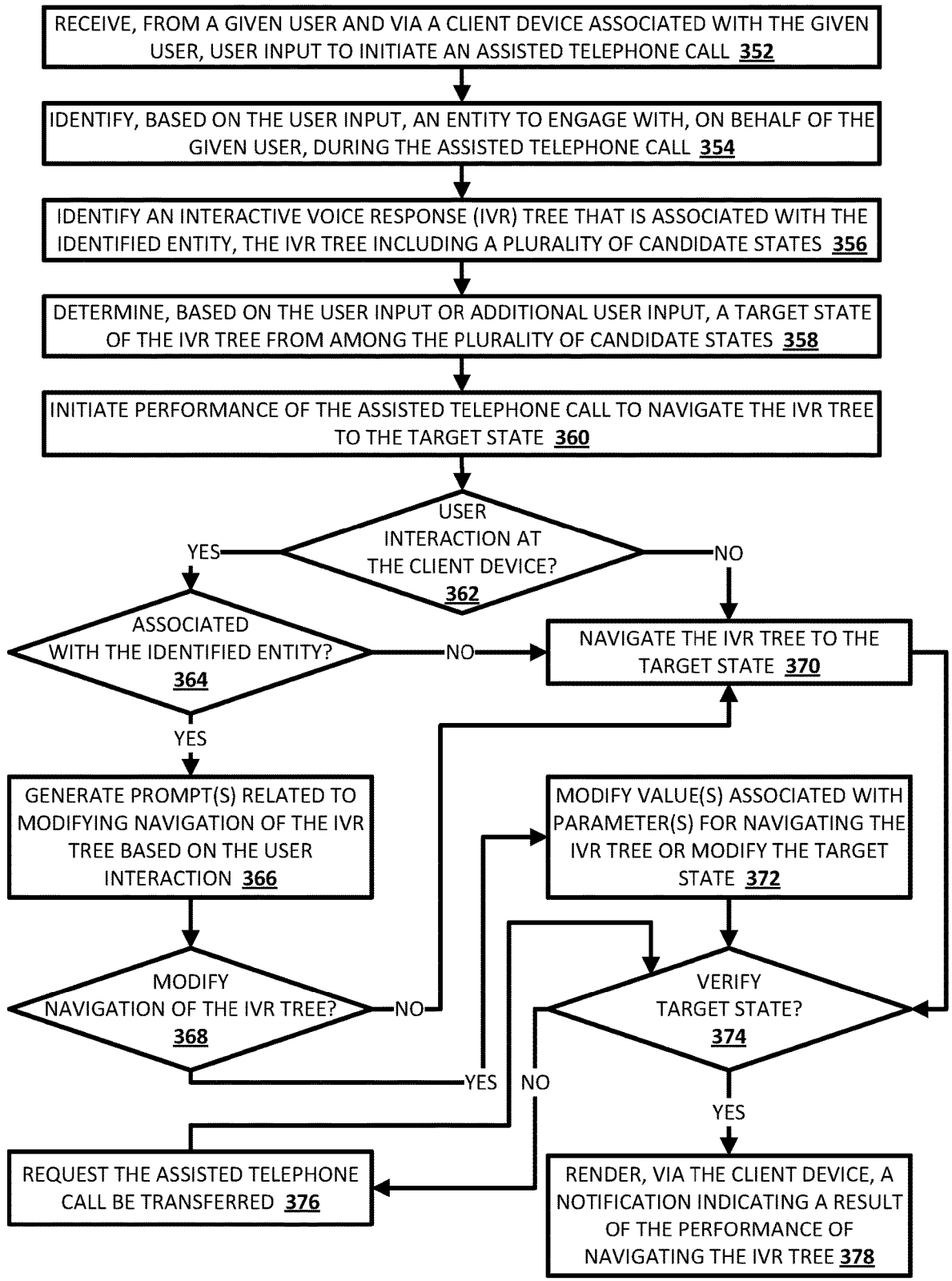
FIG. 3 depicts a flowchart illustrating an example method of modifying navigation of an interactive voice response (IVR) tree based on user interaction(s) at a client device associated with a given user, in accordance with various implementations.

Turning now to FIG. 3, a flowchart illustrating an example method 300 of modifying navigation of an IVR tree based on user interaction(s) at a client device associated with a given user is depicted. For convenience, the operations of the method 300 are described with reference to a system that performs the operations. This system of the method 300 includes one or more processors and/or other component(s) of computing device(s) (e.g., client device 110 of FIGS. 1, 4A-4D, 6A-6E, and/or 8A-8D, and/or computing device 910 of FIG. 9, one or more servers, and/or other computing devices). Moreover, while operations of the method 300 are shown in a particular order, this is not meant to be limiting. One or more operations may be reordered, omitted, and/or added.

At block 352, the system receives, from a given user and via a client device associated with the given user, user input to initiate an assisted telephone call. The user input to initiate the assisted telephone call can be one or more of spoken input to initiate the assisted telephone call, touch input to initiate the assisted telephone call, or typed input to initiate the assisted telephone call. Further, the user input to initiate the assisted telephone call can be received at various interfaces (e.g., a search interface, a voice interface, an automated assistant interface, and/or other interfaces from which the assisted telephone call can be initiated).

At block 354, the system identifies, based on the user input, an entity to engage with, on behalf of the given user, during the assisted telephone call. The system can identify the entity to engage with during the assisted telephone call based on the user input received at block 352 and/or user interactions with the client device immediately prior to initiating of the assisted telephone call. For example, the system can identify an entity of "Example Airlines" based on processing spoken input of "report my lost baggage to Example Airlines" that is received at the client device. As another example, the system can identify an entity of "Example Airlines" based on determining that the given user of the client device selected a call interface element that is associated with Example Airlines or a particular graphical element associated with a candidate state of an IVR tree associated with Example Airlines.

At block 356, the system identifies an IVR tree that is associated with the identified entity, the IVR tree including a plurality of candidate states. The IVR tree that is associated with the identified entity can stored in association with the entity identified at block 354 (e.g., in the entity(s) database 151A of FIG. 1 and/or in the IVR tree(s) database 152A of FIG. 1). The stored IVR tree that is associated by the entity may be previously stored in one or more databases based on the system (and/or additional instances of the system) previously crawling an IVR system associated with the identified entity, and/or the identified entity can provide the IVR tree for the IVR system associated with the identified entity. Further, the system can continuously update the IVR tree for the IVR system associated with the identified entity based on a plurality of assisted telephone calls that navigate the IVR tree. The plurality of candidate states can correspond to particular nodes of the IVR tree to which the system can navigate to during the assisted telephone call.

At block 358, the system determines, based on the user input or additional user input, a target state of the IVR tree from among the plurality of candidate states. In some implementations, the target state can be determined based on the user input received at block 352. For example, assume the IVR tree is associated with an entity of Example Airlines, and assume that a given candidate state of the IVR corresponds to a "report lost baggage" candidate state for the IVR tree that is associated with the entity of Example Airlines. Further assume spoken input of "report my lost baggage to Example Airlines" is received at the client device at block 352. In this example, the target state of "report lost baggage" can be identified based on the spoken input. In some additional or alternative implementations, the target state can be determined based on additional user input that is in addition to the user input received at block 352. For example, assume the IVR tree is associated with an entity of Example Airlines, and assume that a given candidate state of the IVR corresponds to a "report lost baggage" candidate state for the IVR tree that is associated with the entity of Example Airlines. Further assume spoken input of "call Example Airlines" is received at the client device at block 352 or a selection of a selectable graphical element associated with calling Example airlines is received at the client device at block 352. In this example, one or more of the plurality of candidate states can be presented as output at the client device in response to receiving the user input, and the target state can be based on additional user input that selects the target state of "report lost baggage" from among the one or more of the plurality of candidate states that are presented. The output may be presented prior to initiating the assisted telephone call or upon initiating the assisted telephone call.

At block 360, the system initiates performance of the assisted telephone call to navigate the IVR tree to the target state. The system can initiate performance of the assisted telephone by establishing a communications session between the client device that is associated with the given user and an additional client device that is associated with the entity identified at block 354. The communications session can be established using various voice communication protocols including, for example, VoIP, PSTN, and/or other telephonic communication protocols. In some implementations, the system can navigate the IVR tree to the target state by emulating button presses to traverse nodes of the IVR tree, by rendering synthesized speech audio data that includes synthesized speech to traverse the nodes of the IVR tree, and/or by rendering audio data that includes spoken input of the given user associated with the client device (e.g., as described with respect to FIG. 2). In some versions of those implementations, the system can also utilize corresponding value(s) for parameter(s) that are associated with navigating the IVR tree. The corresponding value(s) for the parameter(s) can be retrieved from one or more databases (e.g., the user profile(s) database 153A of FIG. 1) and/or can be solicited from the given user associated with the client device.

At block 362, the system determines whether a user interaction is detected at the client device. The user interactions can include, for example, a search interaction with a web browser or web browser application, a browsing interaction with the web browser or the web browser application, a navigation interaction with the web browser or a navigation application, an assistant interaction with the automated assistant 115, and/or other user interactions with the client device. Notably, while the system performs the assisted telephone call, the given user associated with the client device may still interact with the client device, such that the assisted telephone call is executed in the background of the client device. If, at an iteration of block 362, the system determines no user interaction is detected at the client device, the system may proceed to block 370. Block 370 is described in detail below. If, at an iteration of block 362, the system determines a user interaction is detected at the client device, the system may proceed to block 364.

At block 364, the system determines whether the user interaction detected at block 362 was associated with the entity identified at block 354. For example, the system can determine whether the user interaction is directed to a webpage associated with the entity identified at block 354, directed to obtaining directions to a brick and mortar store associated with the entity identified at block 354, and/or other user interactions directed to the entity. If, at an iteration of block 364, the system determines that the user interaction detected at block 362 was not associated with the entity identified at block 354, the system may proceed to block 370. Block 370 is described in detail below. If, at an iteration of block 364, the system determines that the user interaction detected at block 362 was associated with the entity identified at block 354, the system may proceed to block 366.

At block 366, the system generates one or more prompts related to modifying navigation of the IVR tree based on the user interaction detected at block 362. In some implementations, modifying navigation of the IVR tree can include modifying the target state for navigating the IVR tree to an alternative target state. For example, assume an assisted telephone call is initiated to navigate to a target state associated with a flooring department of an IVR tree associated with a home improvement entity, and further assume a user interaction directed to a portion of a webpage associated with a lighting department of the home improvement entity is detected. In this example, the system can prompt the given user to change the target state from being associated with the flooring department to an alternative target state associated with the lighting department.

In some additional or alternative implementations, modifying navigation of the IVR tree can include adding an additional target state for navigating the IVR tree. Continuing with the above example, rather than prompting the given user to change the target state from being associated with the flooring department to the alternative target state associated with the lighting department, the system can prompt the given user to add the lighting department as an additional target state that is in addition to the target state associated with the flooring department. In this example, the user may be notified to join the assisted telephone call upon arriving at the target state associated with the flooring department. Subsequent to the given user interacting with the flooring department, the given user may terminate the assisted telephone call. However, the system can keep the assisted telephone call connected, and can request a human representative associated with the flooring department transfer the assisted telephone call to the lighting department, or the system can re-navigate the IVR tree to the additional target state associated with the lighting department.

In some additional or alternative implementations, modifying navigation of the IVR tree can include modifying corresponding value(s) for parameter(s) for navigating the IVR tree. For example, assume an assisted telephone call is initiated to navigate to a target state associated with a lighting department of and IVR tree associated with a home improvement entity, and further assume a user interaction directed to a portion of a webpage associated with a particular brand of smart light bulb sold at the home improvement entity is detected. In this example, the system can prompt the given user to include a corresponding value associated with the particular brand of smart light bulb for a parameter associated with navigating to the target state associated with the lighting department. Further, the system can cause the one or more prompts to be rendered visually and/or audibly at the client device associated with the given user.

At block 368, the system determines whether to modify navigation of the IVR tree based on additional user input received responsive to one or more of the prompts. For example, if the user affirmatively responds to one or more of the prompts rendered at the client device, then navigation of the IVR tree can be modified based on the user interaction detected at block 362. However, if the user does not affirmatively respond (or negatively responds) to one or more of the prompts, then navigation of the IVR tree may not be modified. If, at an iteration of block 368, the system determines not to modify navigation of the IVR tree based on the additional user input, the system may proceed to block 370.

At block 370, the system navigates the IVR tree to the target state. In implementations where the system proceeds to block 370 from block 362, 364, and/or 368, the system can continue navigating the IVR tree based on the target state determined at block 358. The system can navigate the IVR tree based on emulating button presses to navigate the IVR tree, causing synthesized speech audio data that includes synthesized speech to be rendered an additional client device associated with the entity identified at block 354, and/or causing audio data that includes spoken input to be rendered at the additional client device associated with the entity identified at block 354. If, at an iteration of block 368, the system determines to modify navigation of the IVR tree based on the additional user input, the system may proceed to block 372. At block 372, the system modifies corresponding value(s) for parameter(s) for navigating the IVR tree or modify the target state to additionally include an additional target state or alternatively include an alternative target state as described above with respect to block 366. Navigating the IVR tree is described in above with respect to FIG. 2.

From block 370 or block 372, the system may proceed to block 374. At block 374, the system can verify whether the assisted telephone call has arrived at the target state. The system can process spoken input received at the client device from a human representative associated with the entity that has joined the call or an additional automated assistant of the IVR system that is associated with the entity to determine whether the system has arrived at the target state. For example, assume that the target state of the IVR tree is associated with a lighting department of a home improvement store entity. Further assume the human representative or the additional automated assistant provides spoken input of "Thank you for calling the lighting department, how may I help?" In this example, the system can determine the spoken input includes the terms "lighting department" to verify the system has in fact arrived at the desired target state of the given user associated with the client device. In some implementations, the spoken input received at the client device may be provided responsive to the system soliciting the spoken input via synthesized speech rendered at the additional client device associated with the human representative or the additional automated assistant (e.g., "Hello, is this the lighting department", or other synthesized speech requesting verification of the target state). If, at an iteration of block 374, the system determines the assisted telephone call has arrived at another state other than the target state, then the system may proceed to block 376. At block 376, the system requests the assisted telephone call to be transferred to a representative associated with the target state. The request to transfer the assisted telephone call can be included in synthesized speech rendered at the additional client device associated with the human representative or the additional automated assistant (e.g., "Can you transfer me to the lighting department", or other synthesized speech requesting the assisted telephone call be transferred). The system may then return to block 374 to verify whether the representative associated with the target state corresponds to the target state subsequent to the transferring. If, at an iteration of block 374, the system determines the assisted telephone call has arrived at the target state, then the system may proceed to block 378.

At block 378, the system renders, via the client device, a notification indicating a result of the performance of navigating the IVR tree. For example, the notification can include a request that the given user associated with the client device joins the assisted telephone call. In implementations described herein where the system also performs a task, on behalf of the given user associated with the client device, and with respect to the entity, the notification can additionally or alternatively include a result of performance of the task.

Figure 4A:
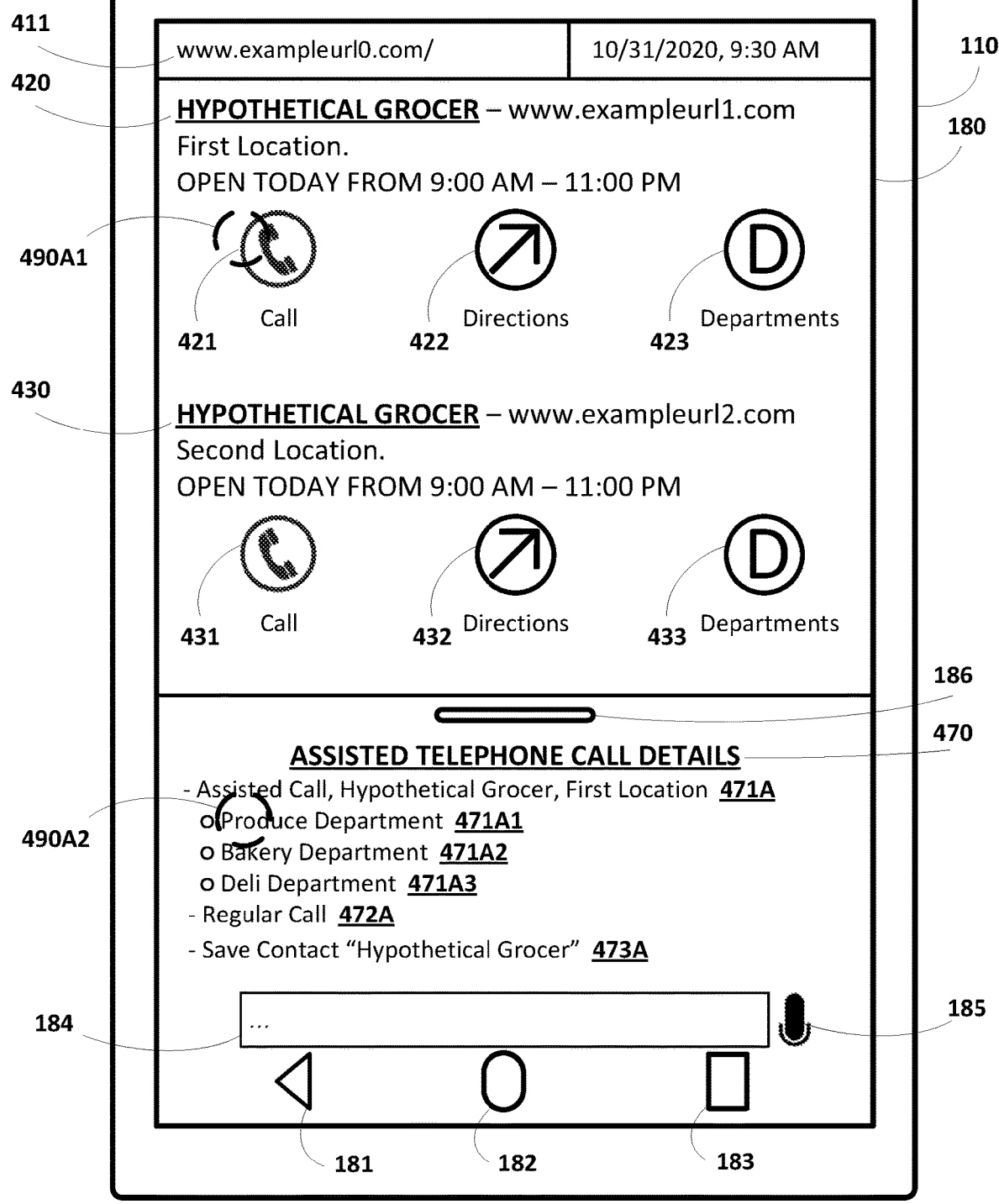
FIG. 4A, FIG. 4B, and FIG. 4C depict various non-limiting examples of user interfaces associated with modifying navigation of an interactive voice response (IVR) tree based on user interaction(s) at a client device associated with a given user, in accordance with various implementations.
Figure 4B:
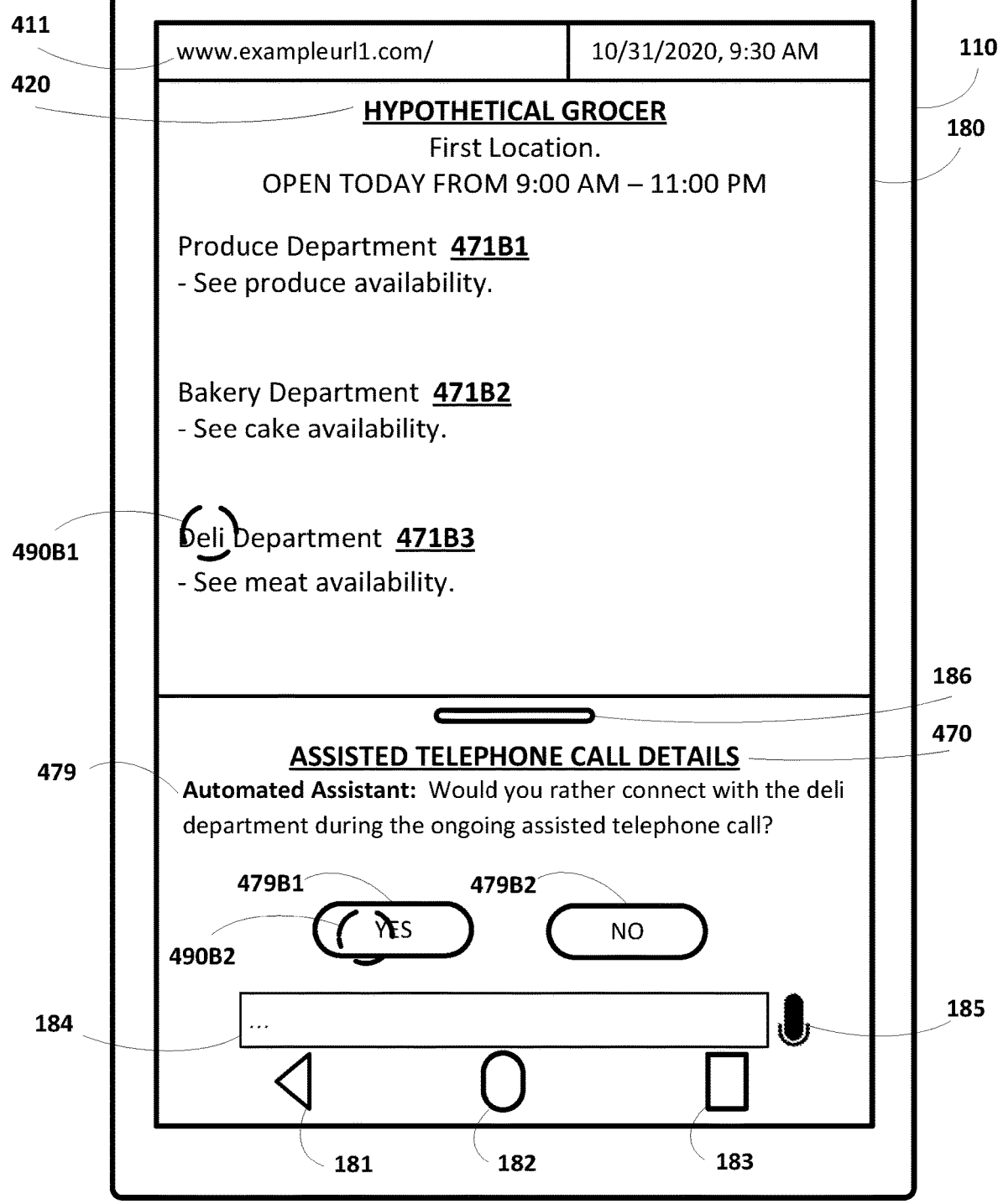
Figure 4C:
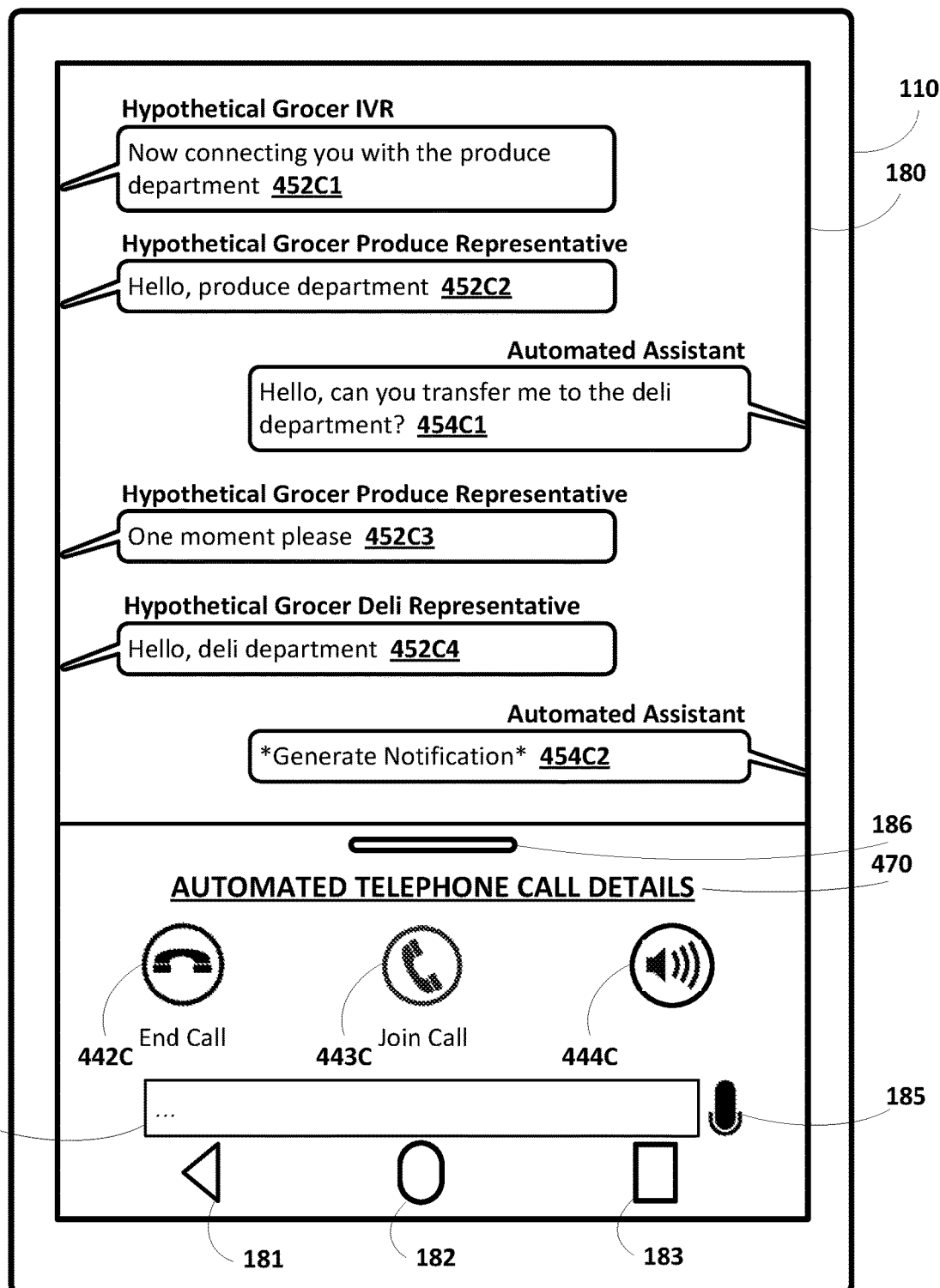

Referring now to FIGS. 4A-4C, various non-limiting examples of user interfaces associated with modifying navigation of an IVR tree based on user interaction(s) at a client device 110 associated with a given user are depicted. FIGS. 4A-4C each depict the client device 110 having a graphical user interface 180, and may include one or more of the components of the client device of FIG. 1. One or more aspects of an automated assistant associated with client device 110 (e.g., automated assistant 115 of FIG. 1) may be implemented locally on the client device 110 and/or on other client device(s) that are in network communication with the client device 110 in a distributed manner (e.g., via network(s) 190 of FIG. 1). For the sake of simplicity, operations of FIGS. 4A-4C are described herein as being performed by the automated assistant. Although the client device 110 of FIGS. 4A-4C is depicted as a mobile phone, it should be understood that is not meant to be limiting. The client device 110 can be, for example, a stand-alone assistant device (e.g., with speaker(s) and/or a display), a laptop, a desktop computer, a vehicular computing device, and/or any other client device capable of making telephonic calls.

The graphical user interface 180 of FIGS. 4A-4C further includes a textual reply interface element 184 that the user may select to generate user input via a virtual keyboard or other touch and/or typed input, and a voice reply interface element 185 that the user may select to generate user input via microphone(s) of the client device 110. In some implementations, the user may generate user input via the microphone(s) without selection of the voice reply interface element 185. For example, active monitoring for audible user input via the microphone(s) may occur to obviate the need for the user to select the voice reply interface element 185. In some of those and/or in other implementations, the voice reply interface element 185 may be omitted. Moreover, in some implementations, the textual reply interface element 184 may additionally and/or alternatively be omitted (e.g., the user may only provide audible user input). The graphical user interface 180 of FIGS. 4A-4C also includes system interface elements 181, 182, 183 that may be interacted with by the user to cause the computing device 110 to perform one or more actions.

In various implementations described herein, user input can be received to initiate a telephonic call with an entity using an automated assistant (e.g., an assisted telephone call). The user input can be spoken input, touch input, and/or typed input that includes an indication to initiate the assisted telephone call. Further, the automated assistant can, on behalf of a given user of the client device 110, navigate an IVR tree associated with the entity to a target state, from among a plurality of candidate states, and/or perform a task with respect to the entity. As shown in FIG. 4A, the user interface 180 includes search results for grocer entities from a browser application accessible at the client device 110 (e.g., as indicated by URL 411 of "www.exampleurl0.com/"). Further, the search results include a first search result 420 of "Hypothetical Grocer" located at a first location, and a second search result 430 of "Hypothetical Grocer" located at a second location.

In some implementations, the search results 420 and/or 430 can be associated with various selectable graphical elements that, when selected, cause the client device 110 to perform corresponding actions. For example, when a call graphical element 421 and/or 431 associated with a given one of the search results 420 and/or 430 is selected, the user input can indicate that a telephonic call action to the grocer entity associated with the search results 420 and/or 430 should be performed. As another example, when a directions graphical element 422 and/or 432 associated with a given one of the search results 420 and/or 430 is selected, the user input can indicate that a navigation action to the grocer entity associated with the search results 420 and/or 430 should be performed. As yet another example, when a departments graphical element 423 and/or 433 associated with a given one of the search results 420 and/or 430 is selected, the user input can indicate that a browser-based action to display the departments for the grocer entity associated with the search results 420 and/or 430 should be performed. Although the assisted telephone call is initiated from a browser application in FIG. 4A, it should be understood that is for the sake of example, and not meant to be limiting. For example, the assisted telephone call can be initiated from various software applications accessible at the client device 110 (e.g., an automated assistant application, a phone applications, a contacts application, an email application, a text or SMS messaging application, and/or other software application), and, if the assisted telephone call is initiated using spoken input, from a home screen of the client device 110, from a locked screen of the client device 110, and/or other states of the client device 110.

For the sake of example, assume user input is detected at the client device 110 to initiate a telephonic call with the first search result 420 of "Hypothetical Grocer" at the first location. The user input can be, for example, spoken input of "call Hypothetical Grocer" (and is selected based on proximity of the first location to the client device 110) or touch input directed to the call graphical element 421 as indicated by 490A1. In some implementations, a call details interface 470 can be rendered at the client device 110 prior to receiving the user input to initiate a telephonic call with "Hypothetical Grocer", or can be rendered at the client device 110 responsive to receiving the user input to initiate a telephonic call with "Hypothetical Grocer" as indicated by 490A1. In some versions of those implementations, the call details interface 470 can be rendered at the client device 110 as part of the user interface 180. In some other versions of those implementations, the call details interface 470 can be a separate interface from the user interface 180 that overlays the user interface 180, and can include a call details interface element 186 that allows the user to expand the call details interface 470 to display additional call details (e.g., by swiping up on the call details interface element 186) and/or dismiss the call details interface 470 (e.g., by swiping down on the call details interface element 186). Although the call details interface 470 is depicted as being at the bottom of the user interface 180, it should be understood that is for the sake of example and not meant to be limiting. For example, the call details interface 470 can be rendered at a top of the user interface 180, a side of the user interface 180, or an entirely separate interface from the user interface 180.

The call details interface 470 can include, in various implementations, a plurality of graphical elements. In some versions of those implementations, the graphical elements can be selectable, such that, when a given one of the graphical elements is selected, the client device 110 can perform the corresponding action. As shown in FIG. 4A, the call details interface 470 includes a first graphical element 471A of "Assisted Call, Hypothetical Grocer, First Location", a second graphical element 472A of "Regular Call", and a third graphical element 473A of "Save Contact 'Hypothetical Grocer'". Notably, in some versions of those implementations, the graphical elements can include sub-elements to provide an indication of candidate states for navigating an IVR tree associated with the "Hypothetical Grocer". For example, the first graphical element 471A can include a first sub-element 471A1 of "Produce Department" associated with a target state of navigating the IVR tree associated with the Hypothetical Grocer to a portion that corresponds to the produce department, a second sub-element 471A2 of "Bakery Department" associated with a target state of navigating the IVR tree associated with the Hypothetical Grocer to a portion that corresponds to the bakery department, and a third sub-element 471A3 of "Deli Department" associated with a target state of navigating the IVR tree associated with the Hypothetical Grocer to a portion that corresponds to the deli department.

For the sake of example, assume user input is detected at the client device 110 to initiate performance of an assisted telephone call with Hypothetical Grocer to navigate to an IVR tree that is associated with the Hypothetical Grocer to a target state associated with the produce department of the Hypothetical Grocer. The user input can be, for example, spoken input of "call the produce department of Hypothetical Grocer" or touch input directed to the first sub-element 471A1 as indicated by 490A2. In response to detecting the user input, the automated assistant can determine the target state of "Produce Department" for navigating the IVR tree that is associated with the Hypothetical Grocer. In some implementations, the automated assistant can identify corresponding value(s) for parameter(s) associated with navigating the IVR tree to the target state and/or corresponding value(s) for a task to be performed upon arriving at the target state that is associated with the produce department as described herein (e.g., with respect to parameter(s) engine 153 of FIG. 1 and with respect to FIG. 2).

In some implementations, and as shown in FIG. 4B, while the automated assistant is navigating the IVR tree to the target state during the assisted telephone call, the given user of the client device 110 may still be able to interact with the client device 110. In some versions of those implementations, user interactions detected at the client device 110 while the automated assistant is navigating the IVR tree may be utilized to modify navigation of the IVR tree. For example, and as shown in FIG. 4B, assume that the give user associated with the client device 110 views the webpage associated with the first search result 420 of "Hypothetical Grocer" at the browser application accessible at the client device 110 (e.g., as indicated by URL 411 of "www.exampleurl1.com/"). In particular, the webpage may include selectable graphical elements corresponding to information related to the various departments of the Hypothetical Grocer. For instance, the given user associated with the client device 110 can select a first graphical selectable element 471B1 to see produce availability at the produce department of the Hypothetical Grocer, select a second graphical selectable element 47162 to see cake availability at the bakery department of the Hypothetical Grocer, or select a third graphical selectable element 47163 to see meat availability at the deli department of the Hypothetical Grocer, or any other graphical selectable elements that may be presented.

For the sake of example, while the automated assistant is navigating the IVR tree that is associated with the Hypothetical Grocer to a target state that is associated with the produce department, assume that the user selects the third graphical selectable element 47163 to see meat availability at the deli department of the Hypothetical Grocer as indicated by 49061. In response to determining that the given user associated with the client device 110 interacted with search results related to the deli department of the Hypothetical Grocer while the automated assistant is navigating the IVR tree associated with the Hypothetical Grocer to a target state that is not associated with the meat department, the automated assistant can generate one or more prompts and render one or more of the prompts at the user interface 180 of the client device 110 as a notification. For instance, the automated assistant can cause notification 479 to be rendered visually in the call details interface 470. The notification 479 includes an indication of "Would you rather connect with the deli department during the ongoing assisted telephone call", and also includes a first suggestion 479B1 of "yes" and a second suggestion 47962 of "no". Further assume, as depicted in FIG. 4B, and in response to rendering the notification 479, additional user input is received at the client device 110 that indicates the given user of the client device 110 would in fact rather connect with the deli department than the produce department as originally intended (e.g., as indicated by 49062 as a selection of the first suggestion 479B1 of "yes"). In this example, navigation of the IVR tree associated with the Hypothetical Grocer can be modified based on the user interactions with the webpage at the client device 110. For instance, rather than navigating the IVR to a target state associated with the produce department as originally intended by the given user associated with the client device 110, the automated assistant can alternatively navigate to an alternative target state associated with the deli department.

In various implementations, the automated assistant may only prompt the given user of the client device 110 to modify navigation of the IVR tree if the user interaction is associated with the entity that is engaged with during the assisted telephone call. For example, the given user of the client device 110 may only be prompted to modify navigation of the IVR tree based on user interactions that are associated with Hypothetical Grocer. In some additional or alternative implementations, the automated assistant may still prompt the given user of the client device 110 to modify navigation of the IVR tree even if the user interaction is not associated with the entity that is engaged with during the assisted telephone call. For example, the given user of the client device 110 may be prompted to modify navigation of the IVR tree based on user interactions that are associated with a webpage for a particular brand of deli meat that is distinct from the Hypothetical Grocer. In this example, the one or more prompts may also include a coupon or advertisement for that particular brand of deli meat.

In some implementations, modifying navigation of the IVR system may be based on a state of navigating the IVR tree. For example, if the automated assistant has not arrived at the target state when additional user input is received responsive to the one or more prompts to modify navigation of the IVR tree, then the automated assistant may modify corresponding value(s) for parameter(s) utilized in navigating the IVR tree to navigate to the target state, modify internal nodes traversed in navigating the IVR tree (e.g., as described with respect to FIG. 2) to navigate to an alternative target state, and/or restart navigation of the IVR tree. As another example, if the automated assistant has arrived at the target state when additional user input is received responsive to the one or more prompts to modify navigation of the IVR tree, then the automated assistant may request the assisted telephone call be transferred to an alternative target state determined based on the additional user input, and/or restart navigation of the IVR tree.

For instance, and referring specifically to FIG. 4C, assume that the automated assistant has navigated the IVR tree to the target state as indicated by the spoken utterance 452C1 of "Now connecting you with the produce department" from the Hypothetical Grocer IVR and the subsequent spoken utterance 452C2 of "Hello, produce department" from the Hypothetical Grocer Produce Representative. Further assume that the automated assistant arrived at the target state prior to receiving the user input indicated by 490B1 of FIG. 4B to modify navigation of the IVR to the alternative target state that is associated with the deli department. Generally, at this stage of navigating the IVR tree that is associated with Hypothetical Grocer, the automated assistant may verify that it has arrived at the target state (e.g., based on the subsequent spoken utterance 452C2) generate a notification that requests the user join the assisted telephone and/or may perform a task on behalf of the given user of the client device 110. However, since the given user provided the user input to modify navigation of the IVR tree in FIG. 4B, the automated assistant can cause synthesized speech 454C1 of "Hello, can you transfer me to the deli department", and spoken utterance 452C3 "One moment please" can be received responsive to the synthesized speech 452C3 as the Hypothetical Grocer Produce Representative places the automated assistant on hold to transfer the call to the deli department, and the automated assistant may remain on hold until the spoken utterance 452C4 of "Hello, deli department" is received. Accordingly, at this stage of navigating the IVR tree that is associated with Hypothetical Grocer, the automated assistant may verify that it has arrived at the target state (e.g., based on the spoken utterance 452C4), and generate a notification (e.g., as indicated by 454C2) that requests the user join the assisted telephone and/or may perform a task on behalf of the given user of the client device 110.

Moreover, in various implementations, the automated assistant can cause a transcript of various dialogs to be visually rendered at the user interface 180 of the client device 110 (e.g., as depicted in FIG. 4C). The transcript can be displayed, for example, at a home screen of the client device 110, at various software applications (e.g., an automated assistant application, a call application, and/or other applications). In some implementations, the transcript can include a dialog between the automated assistant, the IVR system, and/or a human representative associated with the entity. Further, in various implementations, the automated assistant can also cause various graphical elements to be presented in the call details interface 470. For example, a first selectable graphical element 442C associated with ending the assisted telephone call can be provided, a second selectable graphical element 443C associated with ending the given user joining assisted telephone call can be provided, a third selectable graphical element 444C associated with the assisted telephone call being audibly perceptible via speaker(s) of the client device 110 can be provided, and/or other selectable graphical elements associated with the assisted telephone call can be provided. In various implementations, these selectable graphical elements may only be rendered at the call details interface 470 in response to generating the notification as indicated by 452C2.

Although FIGS. 4A-4C are described herein with respect to modifying navigation of the IVR tree associated with the Hypothetical Grocer from the original target state associated with the produce department to the alternative target state associated with the deli department, it should be understood that is for the sake of example and is not meant to be limiting. For example, and as described above (e.g., with respect to the user interaction engine 154 of FIG. 1, with respect to the IVR tree 200 of FIG. 2, and with respect to the method 300 of FIG. 3), modifying navigation of the IVR tree can include adding the deli department as an additional target state that may be navigated to subsequent to navigating to the original target state associated with the produce department. As another example, and as also described above (e.g., with respect to the user interaction engine 154 of FIG. 1, with respect to the IVR tree 200 of FIG. 2, and with respect to the method 300 of FIG. 3), modifying navigation of the IVR tree can include modifying corresponding value(s) for parameter(s) for navigating the IVR tree to the original target state associated with the produce department. For instance, if in navigating to the target state associated with the produce department, the given user indicated that the automated assistant should inquire about avocados, but begins viewing tomatoes on the produce section of the webpage associated with the Hypothetical Grocer, then the user may be prompted as to whether the automated assistant should additionally or alternatively inquire about tomatoes.

Moreover, although FIG. 4C is depicted as including a transcript of the automated assistant navigating the IVR tree that is associated with the Hypothetical Grocer, it should be understood that is for the sake of example and not meant to be limiting. For example, it should be understood that the assisted telephone call described above can be performed while the client device 110 is in a sleep state, a locked state, when other software application(s) are operating in the foreground, and/or in other states. Further, in implementations where the automated assistant causes notification(s) to be rendered at the client device 110, a type of the notification(s) rendered at the client device be based on a state of the client device 110 as described herein. Moreover, although FIGS. 4A-4C are described herein with respect to navigating the IVR tree associated with the Hypothetical Grocer, it should be understood that is also not meant to be limiting, and that the techniques described herein can utilized in navigating any previously stored IVR tree and with respect to a plurality of different entities.

Figure 5:
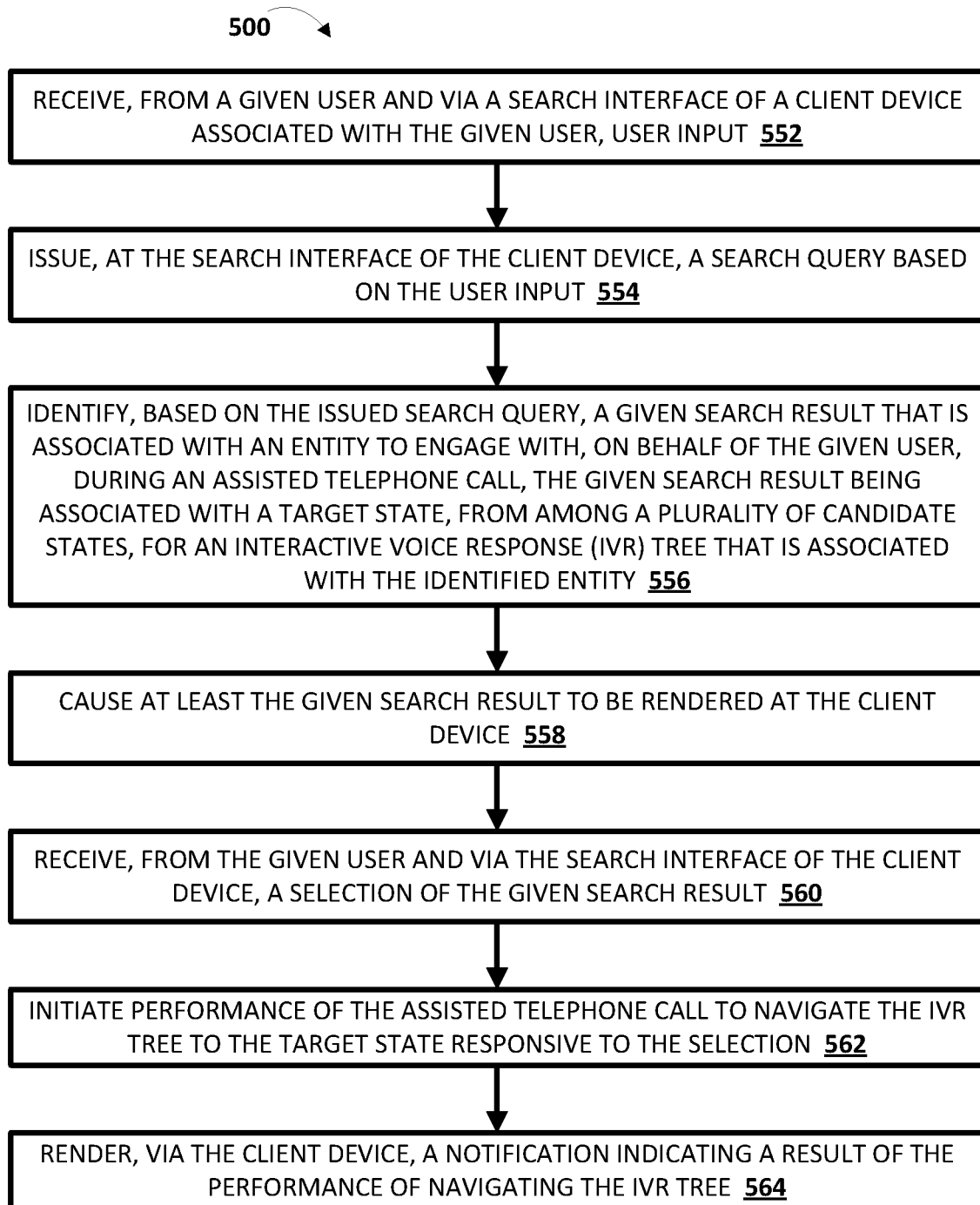
FIG. 5 depicts a flowchart illustrating an example method of navigating an interactive voice response (IVR) tree from a search interface at a client device associated with a given user, in accordance with various implementations.

Turning now to FIG. 5, a flowchart illustrating an example method 500 of navigating an IVR tree from a search interface at a client device associated with a given user is depicted. For convenience, the operations of the method 500 are described with reference to a system that performs the operations. This system of the method 500 includes one or more processors and/or other component(s) of computing device(s) (e.g., client device 110 of FIGS. 1, 4A-4D, 6A-6E, and/or 8A-8D, and/or computing device 910 of FIG. 9, one or more servers, and/or other computing devices). Moreover, while operations of the method 500 are shown in a particular order, this is not meant to be limiting. One or more operations may be reordered, omitted, and/or added.

At block 552, the system receives, from a given user and via a search interface of a client device associated with the given user, user input. The user input to initiate the assisted telephone call can be one or more of spoken input to initiate the assisted telephone call, touch input to initiate the assisted telephone call, or typed input to initiate the assisted telephone call. Further, the user input to initiate the assisted telephone call can be received at various interfaces (e.g., a search interface, a voice interface, an automated assistant interface, and/or other interfaces from which the assisted telephone call can be initiated). Further, the search interface can be, for example, implemented as part of a phone or contacts application, a browser application, an automated assistant application, a web-based browser, and/or any other interface that enables search functionality.

At block 554, the system issues, at the search interface of the client device, a search query based on the user input. The search query can be issued to one or more databases accessible by the client device (e.g., access-restricted databases and/or public databases), a search engine, and/or any other search-based system.

At block 556, the system identifies, based on the issued search query, a given search result that is associated with an entity to engage with, on behalf of the given user, during an assisted telephone call, the given search result being associated with a target state, from among a plurality of candidate states, for an IVR tree that is associated with the identified entity. At block 558, the system causes at least the given search result to be rendered at the client device. At block 560, the system receives, from the given user and via the search interface of the client device, a selection of the given search result. The given search result can include content that is responsive to the search query issued at block 554. In some implementations, additional given search results that correspond to other candidate states can also be rendered along with the given search results. In some versions of those implementations, the given search result can be presented more prominently than the additional given search results associated with the other candidate states based on recent user interactions at the client device. For example, if a user is interacting with other search results related to various brands of paint or painting equipment, and the issued search query is for a home improvement entity, then the given search result can be associated with the home improvement entity, or more particularly a painting department of the home improvement entity. Accordingly, upon selection of the given search result, the system can determine the painting department as being the target state for navigating the IVR tree associated with the home improvement entity. The selection of the given search result can be based on touch input, spoken input, and/or typed input.

At block 562, the system initiates performance of the assisted telephone call to navigate the IVR tree to the target state responsive to the selection. The system can initiate performance of the assisted telephone by establishing a communications session between the client device that is associated with the given user and an additional client device that is associated with the entity identified at block 556. The communications session can be established using various voice communication protocols including, for example, VoIP, PSTN, and/or other telephonic communication protocols. In some implementations, the system can navigate the IVR tree to the target state by emulating button presses to traverse nodes of the IVR tree, by rendering synthesized speech audio data that includes synthesized speech to traverse the nodes of the IVR tree, and/or by rendering audio data that includes spoken input of the given user associated with the client device (e.g., as described with respect to FIG. 2). In some versions of those implementations, the system can also utilize corresponding value(s) for parameter(s) that are associated with navigating the IVR tree. The corresponding value(s) for the parameter(s) can be retrieved from one or more databases (e.g., the user profile(s) database 153A of FIG. 1) and/or can be solicited from the given user associated with the client device.

At block 564, the system renders, via the client device, a notification indicating a result of performance of navigating the IVR tree. For example, the notification can include a request that the given user associated with the client device joins the assisted telephone call. In implementations described herein where the system also performs a task, on behalf of the given user associated with the client device, and with respect to the entity, the notification can additionally or alternatively include a result of performance of the task. In various implementations, navigation of the IVR tree described with respect to FIG. 5 may be modified based on user interactions at the client device as described above with respect to FIGS. 3 and 4A-4C.

Referring now to FIGS. 6A-6E, various non-limiting examples of user interfaces associated with navigating an IVR tree from a search interface at a client device 110 associated with a given user are depicted. FIGS. 6A-6E each depict the client device 110 having a graphical user interface 180, and may include one or more of the components of the client device of FIG. 1. The client device 110 may be substantially similar to the client device of FIGS. 4A-4C, and include many of the same components described above with respect to FIGS. 4A-4C, including an instance of an automated assistant (e.g., the automated assistant 115 of FIG. 1).

Figure 6A:
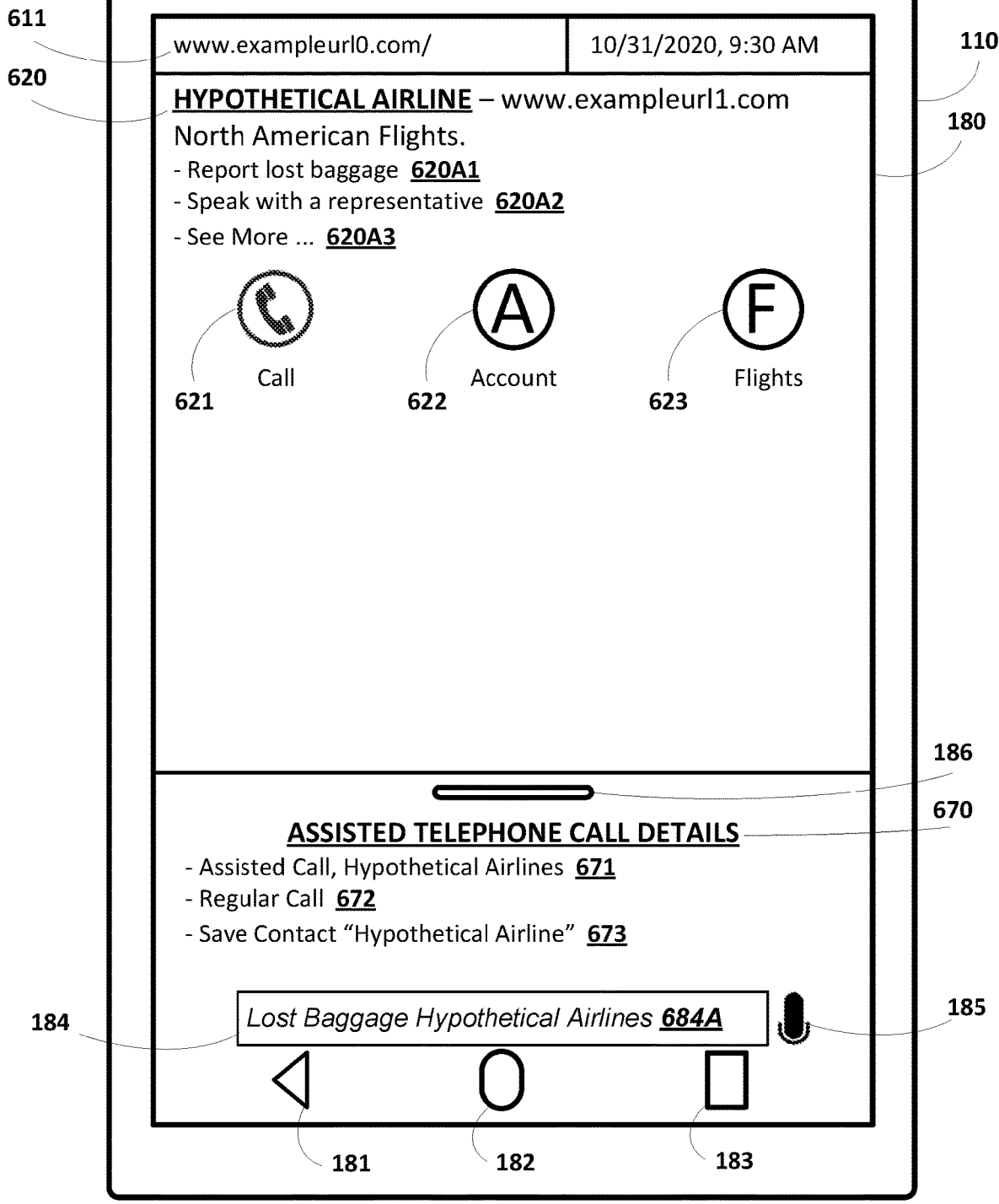
FIG. 6A, FIG. 6B, FIG. 6C, FIG. 6D, and FIG. 6E depict various non-limiting examples of user interfaces associated with navigating an interactive voice response (IVR) tree from a search interface at a client device associated with a given user, in accordance with various implementations.

In various implementations described herein, user input can be received, and a search query can be issued based on the user input. The user input can be spoken input, touch input, and/or typed input that includes the search query. For example, and as shown in FIG. 6A, assume the user provides a search query 684A of "Lost Baggage Hypothetical Airlines" (e.g., as included in the textual reply interface element 184) at a browser application accessible at the client device 110 (e.g., as indicated by URL 611 of "www.exampleurl0.com/"). Further, the search results include a first search result 620 of "Hypothetical Airline" that provides flights servicing North America. In some implementations, the search result 620 can be associated with various selectable graphical elements that, when selected, cause the client device 110 to perform corresponding actions. For example, when a call graphical element 621 associated with the search result 620 is selected, the user input can indicate that a telephonic call action to Hypothetical Airline should be performed. As another example, when a user account graphical element 622 associated with the search result 620 is selected, the user input can indicate that an account lookup action for a user account associated with Hypothetical Airline should be performed. As yet another example, when a flights graphical element 623 associated with the search result 620 is selected, the user input can indicate that a flight lookup action for flights associated with Hypothetical Airline should be performed.

In various implementations, the search result 620 can also include one or more IVR deeplinks to candidate states of an IVR tree associated with the entity. For example, and as shown in FIG. 6A, a first IVR deeplink 620A1 of "report last baggage" corresponding to a candidate state for reporting lost baggage in navigating an IVR tree associated with Hypothetical Airline may be provided, and a second IVR deeplink 620A2 of "speak with a representative" corresponding to a candidate state for speaking with a Hypothetical Airlines representative in navigating the IVR tree associated with Hypothetical Airline may be provided. An additional graphical element 620A3 of "see more" may optionally be provided and, when selected, may cause one or more additional IVR deeplinks associated candidate states to be rendered along with the first deeplink 620A1 and the second deeplink 620A2. In some versions of those implementations, one or more of the IVR deeplinks 620A1 and/or 620A2 that are rendered can be based on recent user interactions at the client device 110. For example, the first IVR deeplink 620A1 of "report lost baggage" may be rendered at the client device 110 based on the search query 684A including "lost baggage" or based on the given user of the client device 110 previously interacting with other search results related to reporting lost baggage. As another example, the second IVR deeplink 620A2 of "speak with a representative" may be rendered at the client device 110 based on it being a most popular target state from among the candidate states. In these examples, the first IVR deeplink 620A1 may be rendered more prominently than the second IVR deeplink 620A2 based on determining it is more relevant to the given user of the client device 110 (e.g., determined based on the search query 684A and/or the based on the given user of the client device 110 previously interacting with other search results).

An assisted telephone to navigate the IVR tree associated with Hypothetical Airlines to a target state associated with reporting lost baggage can be initiated based on user input directed to the first IVR deeplink 620A1, and performance of the assisted telephone call to navigate the IVR tree to the target state can be initiated. In some implementations, the automated assistant can utilize resources of the client device 110 to initiate performance of the assisted telephone call. In some additional or alternative implementations, the automated assistant can utilize resources of a remote system to initiate performance of the assisted telephone call (e.g., a cloud-based assisted telephone call). For example, assume the user selects the first IVR deeplink 620A1, but the client device 110 is not capable of performing a telephone call using a VoIP, PSTN, or other telephonic communications protocol (e.g., via a laptop or desktop computer). In this example, the automated assistant 115 can cause a remote system (that may or may not be in communication with the client device 110) to initiate and perform the assisted telephone call on behalf of the user.

In various implementations, a call details interface 670 can be rendered at the client device 110 prior to receiving user input to initiate a telephonic call with "Hypothetical Airline", or can be rendered at the client device 110 responsive to receiving user input to initiate a telephonic call with Hypothetical Airline. In some versions of those implementations, the call details interface 670 can be rendered at the client device 110 as part of the user interface 180. In some other versions of those implementations, the call details interface 670 can be a separate interface from the user interface 180 that overlays the user interface 180, and can include a call details interface element 186 that allows the user to expand the call details interface 670 to display additional call details (e.g., by swiping up on the call details interface element 186) and/or dismiss the call details interface 670 (e.g., by swiping down on the call details interface element 186). Although the call details interface 670 is depicted as being at the bottom of the user interface 180, it should be understood that is for the sake of example and not meant to be limiting. For example, the call details interface 670 can be rendered at a top of the user interface 180, a side of the user interface 180, or an entirely separate interface from the user interface 180.

The call details interface 670 can include, in various implementations, a plurality of graphical elements. In some versions of those implementations, the graphical elements can be selectable, such that, when a given one of the graphical elements is selected, the client device 110 can perform the corresponding action. As shown in FIG. 6A, the call details interface 670 includes a first graphical element 671 of "Assisted Call, Hypothetical Airline", a second graphical element 672A of "Regular Call", and a third graphical element 673A of "Save Contact 'Hypothetical Airline'". The assisted telephone call can additionally or alternatively be initiated from the call details interface 670 based on user input directed to the first selectable graphical element 671, and performance of the assisted telephone call be based on a selection of the first selectable graphical element 671.

In various implementations, the one or more IVR deeplinks associated with the candidate states may not be rendered. In some versions of those implementations, the automated assistant may visually render various nodes for navigating the IVR tree associated with the entity (e.g., internal nodes and/or leaf nodes as described with respect to FIG. 2). The visual rendering of the various nodes may be based on a confidence level for the IVR tree that is stored in association with the entity. The confidence level for the IVR tree stored in association with the entity may be based on a quantity of assisted telephone calls with the entity that include navigating an IVR tree that is different from the IVR tree stored in association with the entity, and optionally based on an extent of the difference between the navigated IVR tree and the stored IVR tree. In particular, FIGS. 6B-6E illustrate various non-limiting examples for how these various nodes may be presented to the user based on difference confidence levels for the IVR tree that is associated with Hypothetical Airline.

Figure 6B:
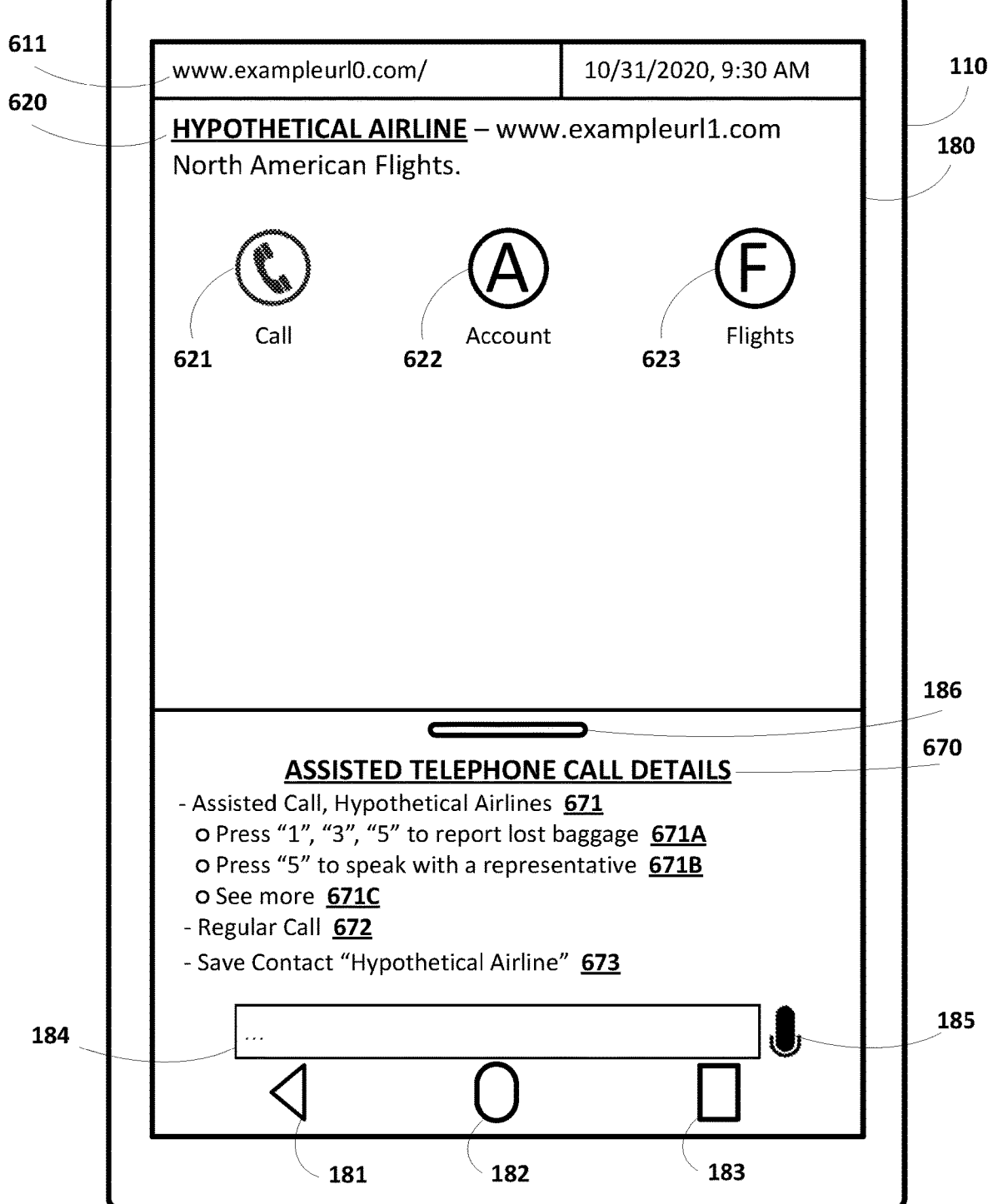

For the sake of example with respect to FIGS. 6B-6E, assume the entity to be engaged with during the assisted telephone call is Hypothetical Airline described above with respect to FIG. 6A and that the user is viewing the first search result 610 that is associated with Hypothetical Airline, but that the user input that includes the search query 684A is not received. Referring specifically to FIG. 6B, further assume that the automated assistant is highly confident in the IVR tree stored in association with Hypothetical Airline. The automated assistant may be highly confident in the IVR tree stored in association with Hypothetical Airline based on a confidence level determined based on the nodes of the IVR tree remaining the same for a majority (if not all) of the assisted telephone calls including the same IVR tree. In this example, rather than providing the one or more IVR deeplinks, the automated assistant can cause information that includes an indication of how to navigate the IVR tree associated with Hypothetical Airline prior to receiving user input to initiate performance of the assisted telephone call. For instance, call details interface 670 can include first information of 671A of "Press '1', '3', '5' to report lost baggage" that indicates a sequence of button presses the given user of the client device 110 can provide to arrive at a target state of the IVR tree that is associated with reporting lost baggage, and second information of 671B of "Press '5' to speak with a representative" that indicates a sequence of button presses the given user of the client device 110 can provide to arrive at a target state of the IVR tree that is associated with speaking with a representative. A graphical element 671C of "see more" may optionally be provided and, when selected, may cause additional information associated with other candidate states to be rendered along with the first information 671A and the second information 671B. Similar to FIG. 6A, the information associated with the candidate states rendered in the call details interface 670 may optionally be rendered based on recent user interactions with the client device 110 and/or overall popularity of the candidate states.

Figure 6C:
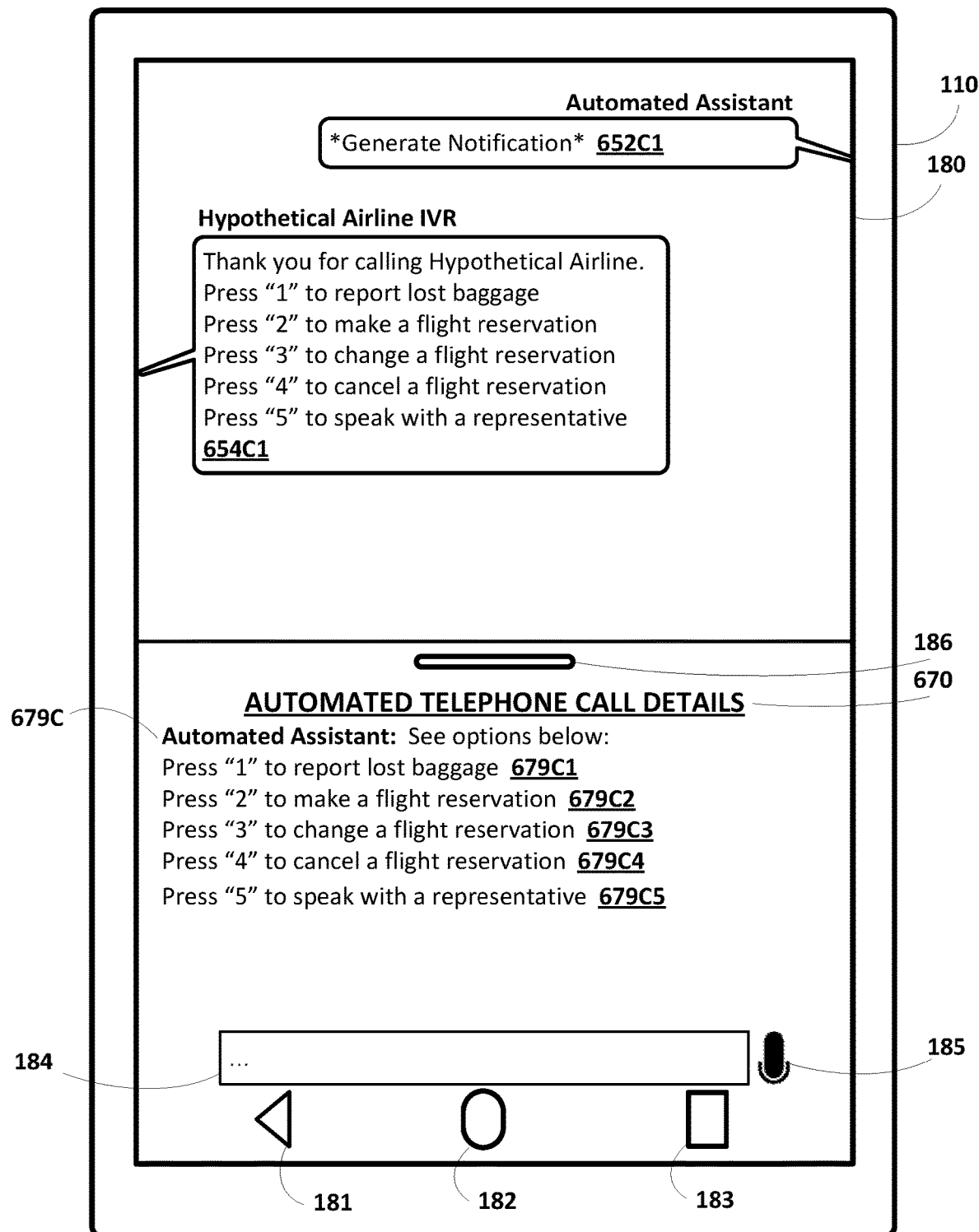

Referring specifically to FIG. 6C, and similar to FIG. 6B, further assume that the automated assistant is highly confident in the IVR tree stored in association with Hypothetical Airline. In this example, rather than providing the one or more IVR deeplinks or the information related to the navigating directly to a desired target state through a sequence of button presses prior to initiating the assisted telephone call, the automated assistant can cause candidate states to be rendered in a notification 679C in the call details interface 670 as indicated by 652C1 prior to receiving a spoken utterance 654C1 from the Hypothetical Airline IVR that includes the candidate states. In particular, the candidate state can include those indicated by 679C1, 679C2, 679C3, 679C4, and 679C5. Each of the candidate states included in the notification 679C may be selectable, such that the given user associated with the client device 110 can simply select a given one of the candidate states as the target state, and the automated assistant will automatically navigate the assisted telephone call to the target state.

Figure 6D:
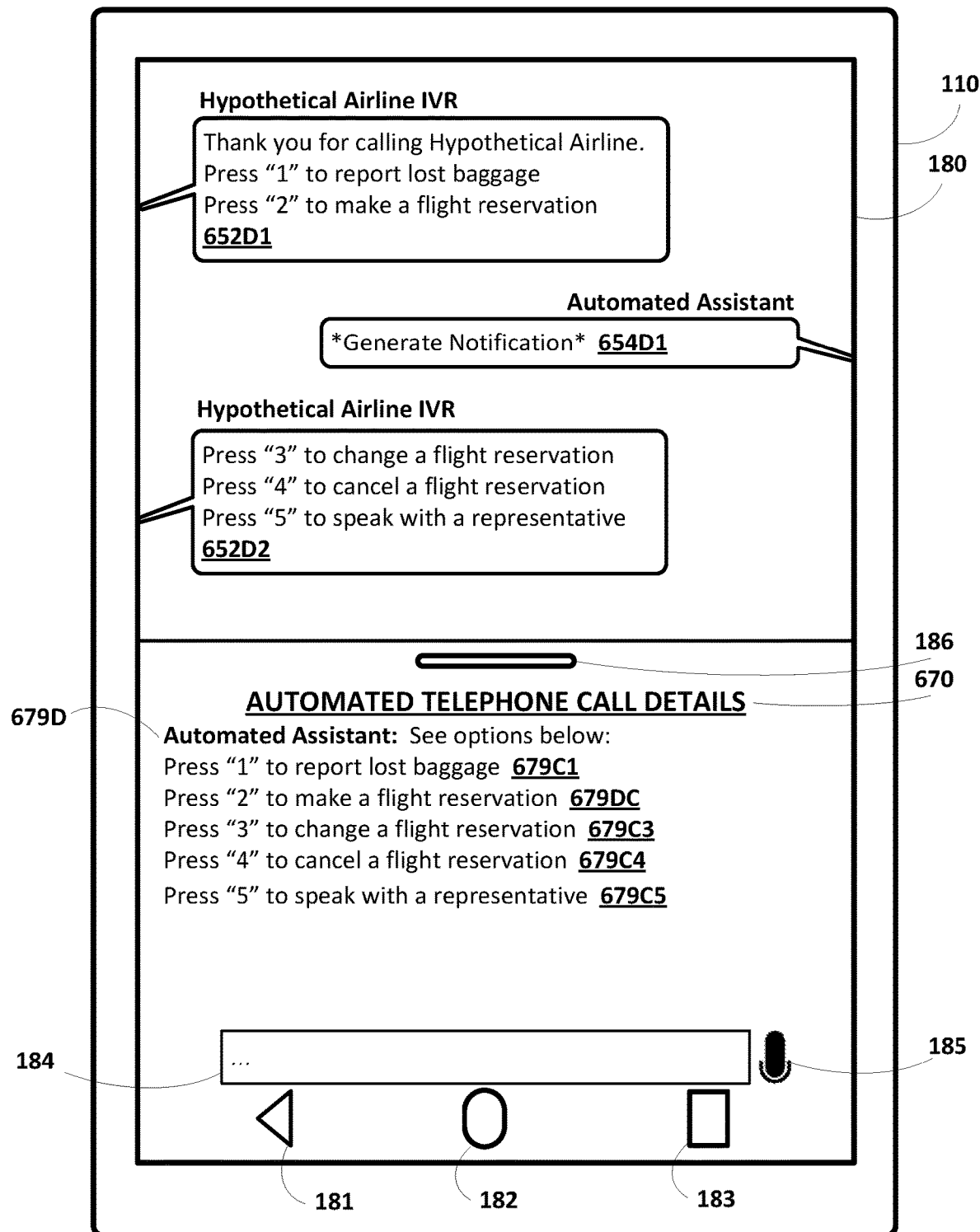

Referring specifically to FIG. 6D, and in contrast with FIG. 6C, further assume that the automated assistant is moderately confident in the IVR tree stored in association with Hypothetical Airline. The automated assistant may be moderately confident in the IVR tree stored in association with Hypothetical Airline based on a confidence level determined based on the nodes of the IVR tree including some differences for some of the assisted telephone calls including the same IVR tree. In this example, rather than providing a notification 679D in the call details interface 670 prior to receiving a spoken utterance from the Hypothetical Airline IVR that includes the candidate states, the automated assistant may wait until a first portion of a spoken response 652D1 that includes a subset of the candidate states is provided by the Hypothetical Airline IVR to render the notification 679C that includes the candidate states. For instance, the extent of the differences between the stored IVR tree that is associated with the Hypothetical Airline may only be moderately confident in the sub-set of the candidate state included in the first portion of the spoken utterance 652D1, but highly confident in the remaining candidate states. Accordingly, subsequent to the sub-set of the candidate states being included in the first portion of the spoken utterance 652D1, the automated assistant may generate the notification 679D as indicated by 654D1 prior to receiving a second portion of the spoken utterance 652D2. Similar to FIG. 6C, each of the candidate states included in the notification 679D may be selectable, such that the given user associated with the client device 110 can simply select a given one of the candidate states as the target state, and the automated assistant will automatically navigate the assisted telephone call to the target state.

Figure 6E:
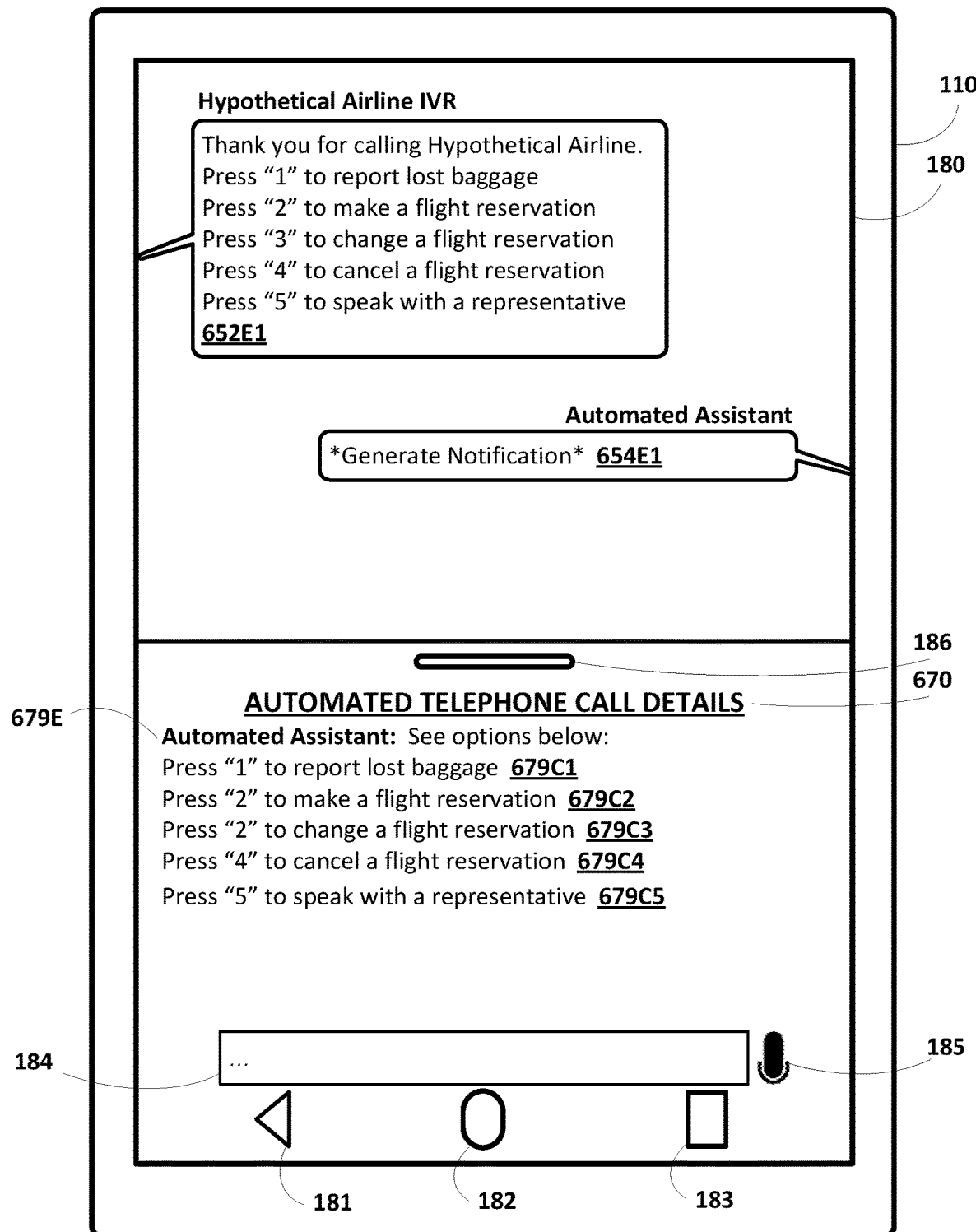

Referring specifically to FIG. 6E, and in contrast with FIGS. 6C and 6D, further assume that the automated assistant is not confident in the IVR tree stored in association with Hypothetical Airline. The automated assistant may not be confident in the IVR tree stored in association with Hypothetical Airline based on a confidence level determined based on the nodes of the IVR tree including differences for a threshold number of the assisted telephone calls including a different IVR tree. In this example, rather than providing a notification 679E in the call details interface 670 prior to receiving a spoken utterance, the automated assistant may wait until a spoken response 652E1 that includes the candidate states is provided by the Hypothetical Airline IVR to render the notification 679D that includes the candidate states as indicated by 654E1. Similar to FIG. 6C, each of the candidate states included in the notification 679E may be selectable, such that the given user associated with the client device 110 can simply select a given one of the candidate states as the target state, and the automated assistant will automatically navigate the assisted telephone call to the target state.

Although FIGS. 6A-6E are described herein with respect to the entity Hypothetical Airline, and certain graphical elements and information are depicted along with the search result 620 and the call details interface, it should be understood that is for the sake of example and is not meant to be limiting. It should be understood an IVR tree that is associated with any entity that employs an IVR system can be stored, and subsequently utilized in performing assisted telephone calls. Further, it should be understood that graphical elements and information provided by the automated assistant may be based on the IVR tree, and that the configurations of the IVR tree that is associated with the entity are virtually limitless.

Figure 7:
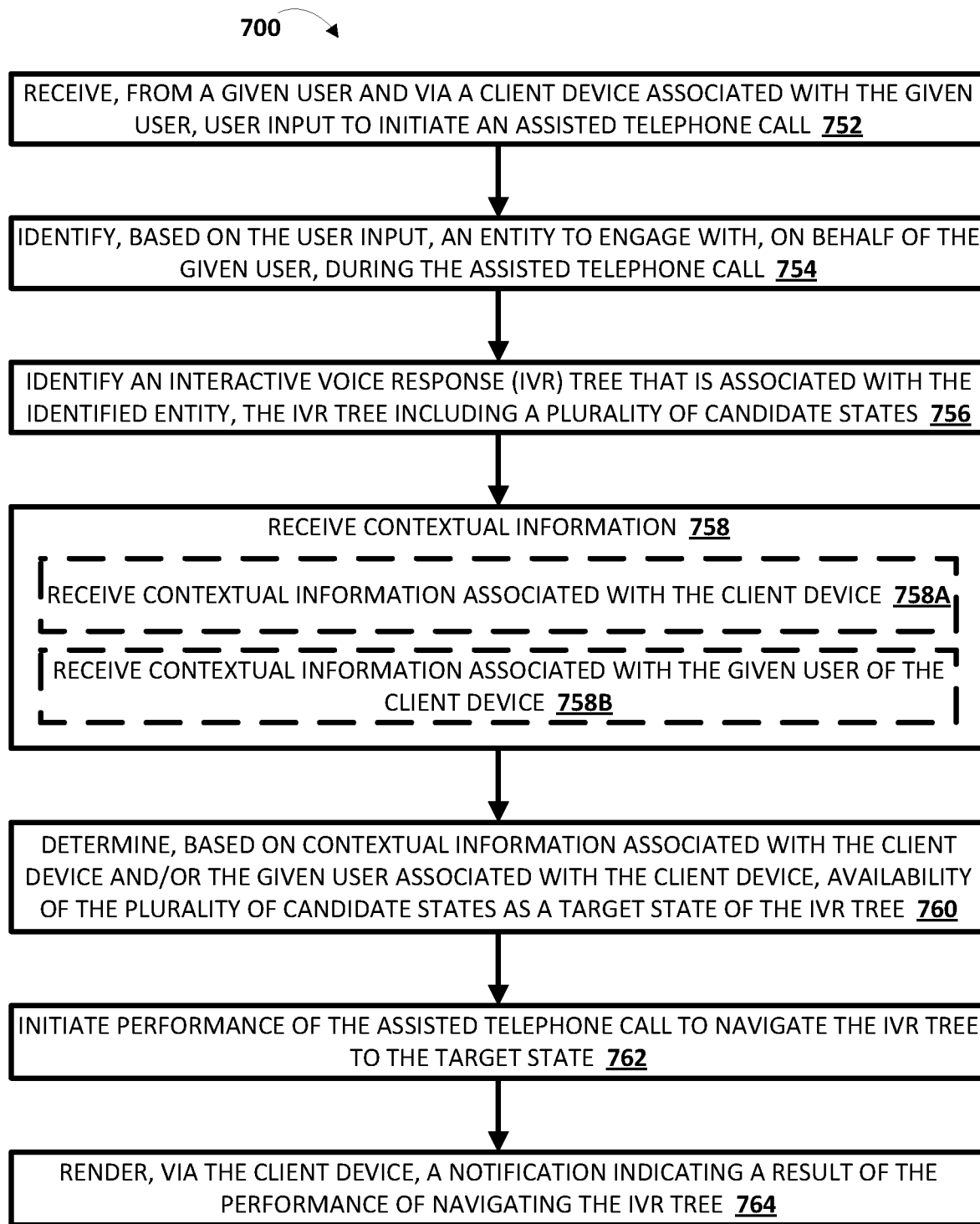
FIG. 7 depicts a flowchart illustrating an example method of navigating a dynamic interactive voice response (IVR) tree, in accordance with various implementations.

Turning now to FIG. 7, a flowchart illustrating an example method 700 of navigating a dynamic interactive voice response (IVR) tree is depicted. For convenience, the operations of the method 700 are described with reference to a system that performs the operations. This system of the method 700 includes one or more processors and/or other component(s) of computing device(s) (e.g., client device 110 of FIGS. 1, 4A-4D, 6A-6E, and/or 8A-8D, and/or computing device 910 of FIG. 9, one or more servers, and/or other computing devices). Moreover, while operations of the method 700 are shown in a particular order, this is not meant to be limiting. One or more operations may be reordered, omitted, and/or added.

At block 752, the system receives, from a given user and via a client device associated with the given user, user input to initiate an assisted telephone call. The user input to initiate the assisted telephone call can be one or more of spoken input to initiate the assisted telephone call, touch input to initiate the assisted telephone call, or typed input to initiate the assisted telephone call. Further, the user input to initiate the assisted telephone call can be received at various interfaces (e.g., a search interface, a voice interface, an automated assistant interface, and/or other interfaces from which the assisted telephone call can be initiated).

At block 754, the system identifies, based on the user input, an entity to engage with, on behalf of the given user, during the assisted telephone call. The system can identify the entity to engage with during the assisted telephone call based on the user input received at block 752 and/or user interactions with the client device immediately prior to initiating of the assisted telephone call. For example, the system can identify an entity of "Example Airlines" based on processing spoken input of "report my lost baggage to Example Airlines" that is received at the client device. As another example, the system can identify an entity of "Example Airlines" based on determining that the given user of the client device selected a call interface element that is associated with Example Airlines or a particular graphical element associated with a candidate state of an IVR tree associated with Example Airlines.

At block 756, the system identifies an IVR tree that is associated with the entity identified at block 754, the IVR tree including a plurality of candidate states. The IVR tree that is associated with the identified entity can stored in association with the entity identified at block 754 (e.g., in the entity(s) database 151A of FIG. 1 and/or in the IVR tree(s) database 152A of FIG. 1). The stored IVR tree that is associated by the entity may be previously stored in one or more databases based on the system (and/or additional instances of the system) previously crawling an IVR system associated with the identified entity, and/or the identified entity can provide the IVR tree for the IVR system associated with the identified entity. Further, the system can continuously update the IVR tree for the IVR system associated with the identified entity based on a plurality of assisted telephone calls that navigate the IVR tree. The plurality of candidate states can correspond to particular nodes of the IVR tree to which the system can navigate to during the assisted telephone call.

At block 758, the system receives contextual information. In some implementations, block 756 can include optional sub-block 758A and/or optional sub-block 758B. If included, at optional sub-block 758A, the system receives contextual information associated with the client device. The contextual information associated with the client device can include, for example, device state information (e.g., determined via the device state engine 112), date and/or time information associated with a current location of the client device, the current location of the client device, and/or other contextual information generated by the client device. If included, at optional sub-block 758B, the system receives contextual information associated with the given user of the client device. The contextual information associated with the given user of the client device can include, for example, electronic communications created by the user of the client device or received by the user of the client device (e.g., emails, text messages, voice messages, and so on), user account information associated with various user accounts of the given user of the client device (e.g., account status information, account numbers, account user names, account passwords, and so on), pecuniary information of the given user of the client device (e.g., bank account number, credit card number, payment application information, etc.), photo albums of the given user of the client device, social media profile(s) of the given user of the client device, user preferences of the user of the client device, personal information of the given user of the client device (e.g., name, phone number, physical address, email address, social security number, date of birth, and so on), and/or other information associated with the given user of the client device.

At block 760, the system determines, based on contextual information associated with the client device and/or the given user of the client device, availability of the plurality of candidate states as a target state of the IVR tree. In various implementations, some candidate states of an IVR tree may or may not be available to the given user of the client device based on the contextual information. For example, assume the entity identified at block 754 is a restaurant entity. In this example, some candidate states may only be available during operating hours of the restaurant (e.g., a candidate state associated with placing a carryout order). As another example, assume the entity identified at block 754 is an airline entity. In this example, some candidate states may only be available if the user account status is above a threshold membership status (e.g., only for gold status members and above). In other words, the IVR tree associated with the identified entity may be dynamic in that the candidate states may or may not be available in certain contexts.

At block 762, the system initiates performance of the assisted telephone call to navigate the IVR tree to the target state. The system can initiate performance of the assisted telephone call responsive to additional user input that selects the target state. Further, the system can initiate performance of the assisted telephone by establishing a communications session between the client device that is associated with the given user and an additional client device that is associated with the entity identified at block 754. The communications session can be established using various voice communication protocols including, for example, VoIP, PSTN, and/or other telephonic communication protocols. In some implementations, the system can navigate the IVR tree to the target state by emulating button presses to traverse nodes of the IVR tree, by rendering synthesized speech audio data that includes synthesized speech to traverse the nodes of the IVR tree, and/or by rendering audio data that includes spoken input of the given user associated with the client device (e.g., as described with respect to FIG. 2). In some versions of those implementations, the system can also utilize corresponding value(s) for parameter(s) that are associated with navigating the IVR tree. The corresponding value(s) for the parameter(s) can be retrieved from one or more databases (e.g., the user profile(s) database 153A of FIG. 1) and/or can be solicited from the given user associated with the client device.

At block 764, the system renders, via the client device, a notification indicating a result of performance of navigating the IVR tree. For example, the notification can include a request that the given user associated with the client device joins the assisted telephone call. In implementations described herein where the system also performs a task, on behalf of the given user associated with the client device, and with respect to the entity, the notification can additionally or alternatively include a result of performance of the task. In various implementations, navigation of the IVR tree described with respect to FIG. 5 may be modified based on user interactions at the client device as described above with respect to FIGS. 3 and 4A-4C.

Referring now to FIGS. 8A-8D, various non-limiting examples of user interfaces associated with navigating a dynamic IVR tree are depicted. FIGS. 8A-8D each depict the client device 110 having a graphical user interface 180, and may include one or more of the components of the client device of FIG. 1. The client device 110 may be substantially similar to the client device of FIGS. 4A-4C, and include many of the same components described above with respect to FIGS. 4A-4C, including an instance of an automated assistant (e.g., the automated assistant 115 of FIG. 1).

In various implementations described herein, an IVR tree associated with an entity can be a dynamic IVR tree in that one or more candidate states associated with the IVR tree may or may not be available. The availability of one or more of the candidate state may be determined based on contextual information. In some implementations, the contextual information may be contextual information associated with the client device 110, and may include, for example, device state information of the client device 110 (e.g., determined via the device state engine 112), date and/or time information associated with a current location of the client device 110, the current location of the client device, and/or other contextual information generated by the client device 110. In some additional or alternative implementations, the contextual information may be contextual information associated with the given user of the client device 110, and may include, for example, electronic communications created by the user of the client device or received by the user of the client device (e.g., emails, text messages, voice messages, and so on), user account information associated with various user accounts of the given user of the client device 110 (e.g., account status information, account numbers, account user names, account passwords, and so on), pecuniary information of the given user of the client device 110 (e.g., bank account number, credit card number, payment application information, etc.), photo albums of the given user of the client device 110, social media profile(s) of the given user of the client device 110, user preferences of the user of the client device 110, personal information of the given user of the client device (e.g., name, phone number, physical address, email address, social security number, date of birth, and so on), and/or other information associated with the given user of the client device.

Figure 8A:
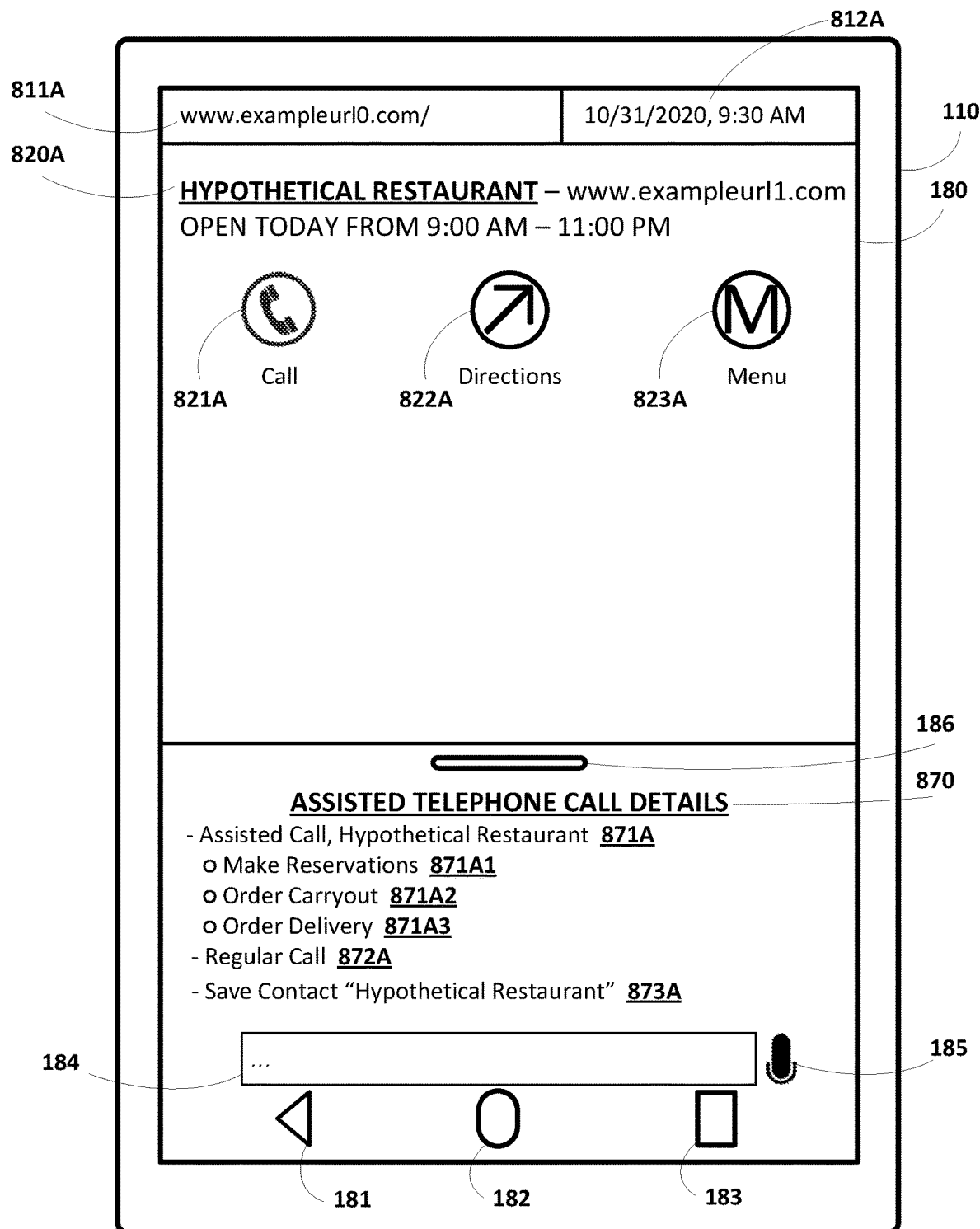
FIG. 8A, FIG. 8B, FIG. 8C, and FIG. 8D depict various non-limiting examples of user interfaces associated with navigating a dynamic interactive voice response (IVR) tree, in accordance with various implementations.
Figure 8B:
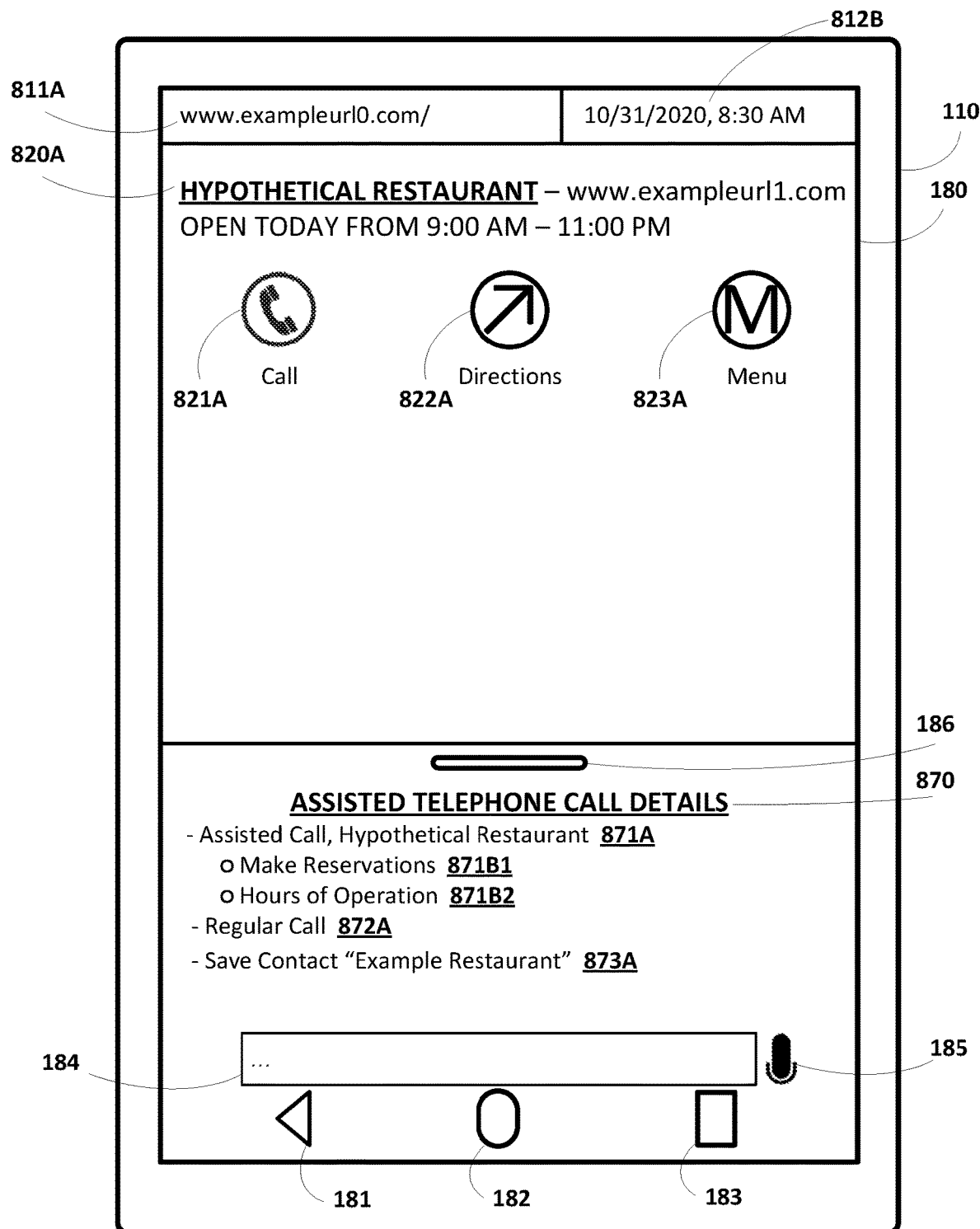

Referring specifically to FIGS. 8A and 8B, assume that the given user of the client device 110 is viewing search results for a restaurant entity at a browser application accessible at the client device 110 (e.g., as indicated by URL 811A of "www.exampleurl0.com/"). Further assume the search results include at least search result 820A of "Hypothetical Restaurant" that is open from 9:00 AM to 11:00 PM. In some implementations, the search result 820A can be associated with various selectable graphical elements that, when selected, cause the client device 110 to perform corresponding actions. For example, when a call graphical element 821A associated with the search result 820A is selected, the user input can indicate that a telephonic call action to Hypothetical Restaurant should be performed. As another example, when a directions graphical element 822A associated with the search result 820A is selected, the user input can indicate that navigation action to a brick and mortar location of Hypothetical Restaurant should be performed. As yet another example, when a menu graphical element 823A associated with the search result 820A is selected, the user input can indicate that a menu lookup action for a menu associated with Hypothetical Airline should be performed.

In various implementations, a call details interface 870 can be rendered at the client device 110 prior to receiving user input to initiate a telephonic call with "Hypothetical Restaurant", or can be rendered at the client device 110 responsive to receiving user input to initiate a telephonic call with Hypothetical Restaurant. In some versions of those implementations, the call details interface 870 can be rendered at the client device 110 as part of the user interface 180. In some other versions of those implementations, the call details interface 870 can be a separate interface from the user interface 180 that overlays the user interface 180, and can include a call details interface element 186 that allows the user to expand the call details interface 870 to display additional call details (e.g., by swiping up on the call details interface element 186) and/or dismiss the call details interface 870 (e.g., by swiping down on the call details interface element 186). Although the call details interface 870 is depicted as being at the bottom of the user interface 180, it should be understood that is for the sake of example and not meant to be limiting. For example, the call details interface 870 can be rendered at a top of the user interface 180, a side of the user interface 180, or an entirely separate interface from the user interface 180.

The call details interface 870 can include, in various implementations, a plurality of graphical elements. In some versions of those implementations, the graphical elements can be selectable, such that, when a given one of the graphical elements is selected, the client device 110 can perform the corresponding action. As shown in FIGS. 8A and 8B, the call details interface 870 includes a first graphical element 871A of "Assisted Call, Hypothetical Restaurant", a second graphical element 872A of "Regular Call", and a third graphical element 873A of "Save Contact 'Hypothetical Restaurant'". The graphical elements may also include sub-elements that correspond to candidate states that are associated with an IVR tree that is associated with the Hypothetical Restaurant. For example, and as shown in FIG. 8A, the first graphical element 871A can include a first sub-element 871A1 of "Make Reservations" associated with a target state of navigating the IVR tree associated with the Hypothetical Restaurant to a portion that corresponds to making restaurant reservations, a second sub-element 871A2 of "Order Carryout" associated with a target state of navigating the IVR tree associated with the Hypothetical Restaurant to a portion that corresponds to ordering carryout from the restaurant, and a third sub-element 871A3 of "Order Delivery" associated with a target state of navigating the IVR tree associated with the Hypothetical Restaurant to a portion that corresponds to ordering delivery from the Hypothetical Restaurant. In contrast, and as shown in FIG. 8B, the first graphical element 871A can include a first sub-element 871B1 of "Make Reservations" associated with a target state of navigating the IVR tree associated with the Hypothetical Restaurant to a portion that corresponds to making restaurant reservations, and a second sub-element 871B2 of "Hours of Operation" associated with a target state of navigating the IVR tree associated with the Hypothetical Restaurant to a portion that corresponds to listening to hours of operation of the Hypothetical Restaurant.

Notably, the difference in the candidate states included in FIGS. 8A and 8B may be based on contextual information associated with the client device 110 of the given user. Notably, and with respect to FIG. 8A, time and date information 812A at a current location of the client device 110 indicates a time of 9:30 AM, and that corresponds to the Hypothetical Restaurant being open (e.g., based on the hours of operation being 9:00 AM-11:00 PM). As a result, candidate states associated with the selectable sub-elements 871A2 and 871A3 may be available since Hypothetical Restaurant is open. In contrast, and with respect to FIG. 8B, time and date information 812B at a current location of the client device 110 indicates a time of 8:30 AM, and that corresponds to the Hypothetical Restaurant being closed (e.g., based on the hours of operation being 9:00 AM-11:00 PM. As a result, candidate states associated with the selectable sub-elements 871A2 and 871A3 may not be available since Hypothetical Restaurant is closed, but the automated assistant may still be able to make restaurant reservations and/or inquire about hours of operation by navigating the IVR tree associated with the Hypothetical Restaurant even though it is closed. Accordingly, the IVR tree may be dynamic in that some of the candidate states may be available in a given context, whereas other candidate states may not be available in the given context. As another example, assume in FIG. 8A that Hypothetical Restaurant is open, but a current location of the client device 110 is outside of a delivery radius for the Hypothetical Restaurant. In this example, the candidate state associated with the third sub-element 871A3 of "Order Delivery" may be omitted. As yet another example, assume in FIG. 8A that Hypothetical Restaurant is open, but neither indoor nor outdoor dining is available at Hypothetical Restaurant. In this example, the candidate state associated with the first sub-element 871A1 of "Make Reservations" may be omitted.

Figure 8C:
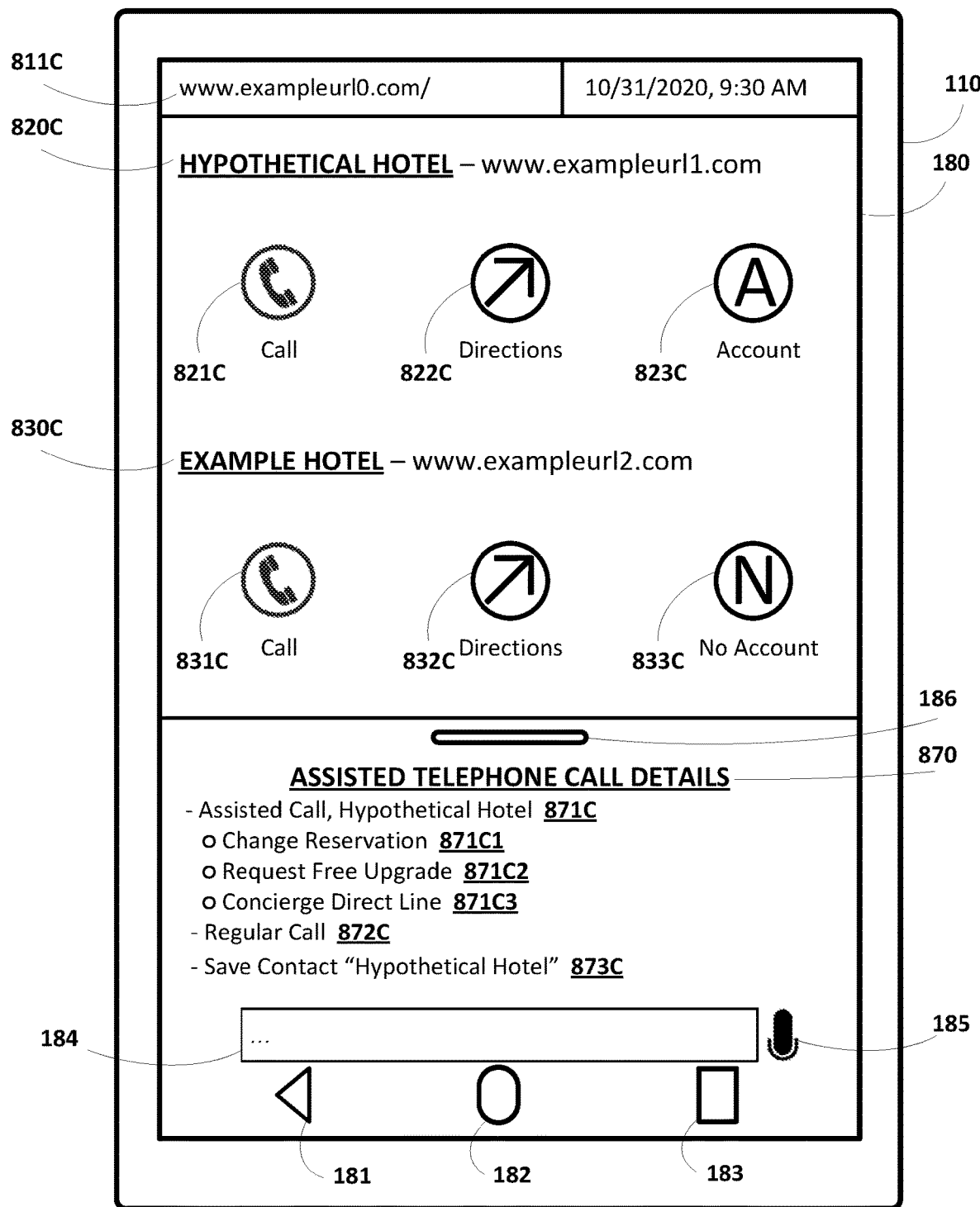
Figure 8D:
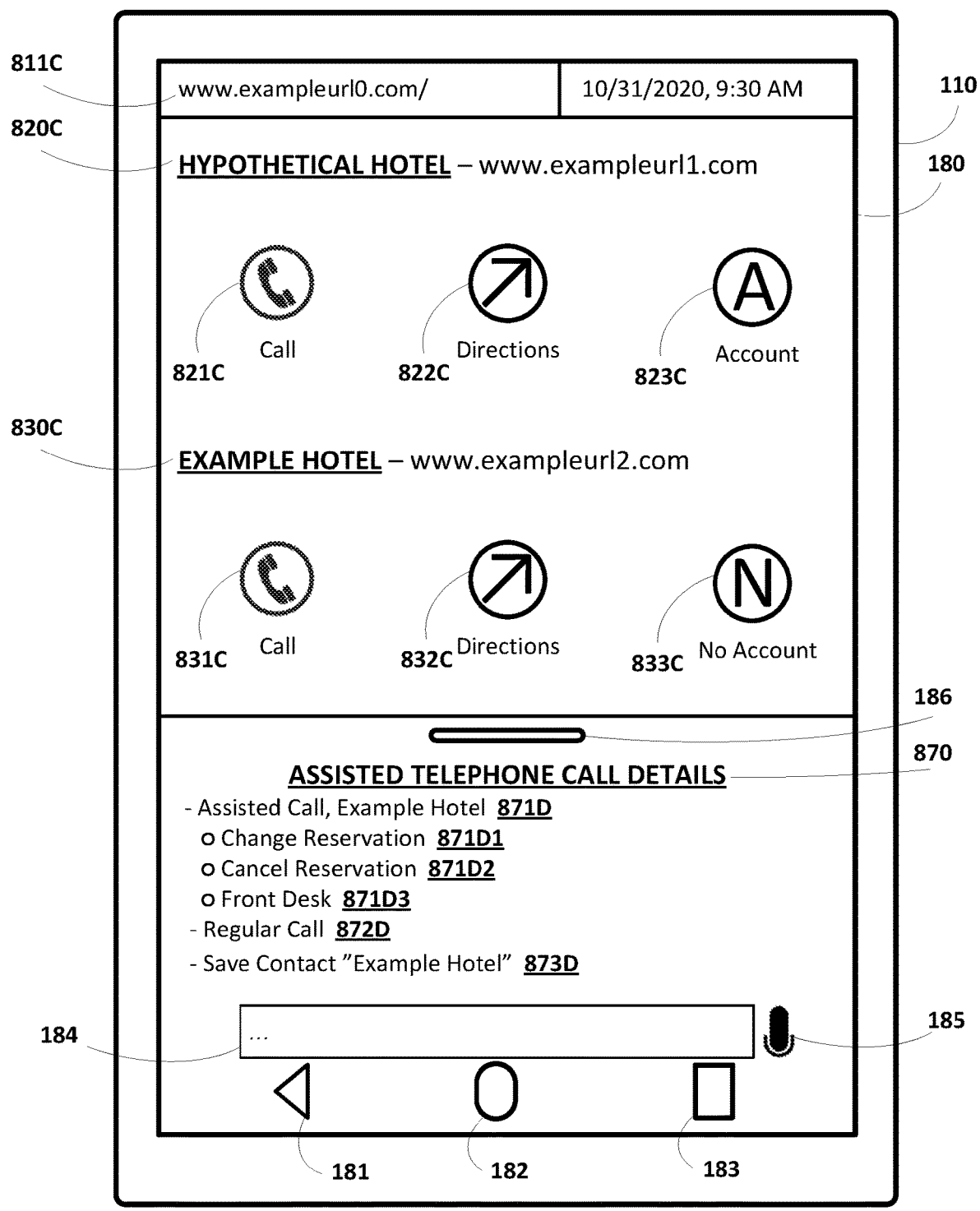

Referring specifically to FIGS. 8C and 8D, assume that the given user of the client device 110 is viewing search results for hotel entities at a browser application accessible at the client device 110 (e.g., as indicated by URL 811C of "www.exampleurl0.com/"). Further assume the search results include at least a first search result 820C of "Hypothetical Hotel", and a second search result 830C of "Example Hotel". In some implementations, the search results 820C and/or 830C can be associated with various selectable graphical elements that, when selected, cause the client device 110 to perform corresponding actions. For example, when a call graphical element 821C and/or 831C associated with the search result 820A and/or 830C, respectively, is selected, the user input can indicate that a telephonic call action to the respective hotel entity should be performed. As another example, when a directions graphical element 822C and/or 832C associated with the search result 820A and/or 830C, respectively, is selected, the user input can indicate that navigation action to a brick and mortar location of the respective hotel entity should be performed. As yet another example, when an account element 823C and/or 833C associated with the search result 820A and/or 830C, respectively, is selected, the user input can indicate that an account lookup action for a user account associated with the respective hotel entity should be performed.

In various implementations, a call details interface 870 can be rendered at the client device 110 prior to receiving user input to initiate a telephonic call with a respective one of the hotel entities, or can be rendered at the client device 110 responsive to receiving user input to initiate a telephonic call with a respective one of the hotel entities. In some versions of those implementations, the call details interface 870 can be rendered at the client device 110 as part of the user interface 180. In some other versions of those implementations, the call details interface 870 can be a separate interface from the user interface 180 that overlays the user interface 180, and can include a call details interface element 186 that allows the user to expand the call details interface 870 to display additional call details (e.g., by swiping up on the call details interface element 186) and/or dismiss the call details interface 870 (e.g., by swiping down on the call details interface element 186). Although the call details interface 870 is depicted as being at the bottom of the user interface 180, it should be understood that is for the sake of example and not meant to be limiting. For example, the call details interface 870 can be rendered at a top of the user interface 180, a side of the user interface 180, or an entirely separate interface from the user interface 180.

The call details interface 870 can include, in various implementations, a plurality of graphical elements. In some versions of those implementations, the graphical elements can be selectable, such that, when a given one of the graphical elements is selected, the client device 110 can perform the corresponding action. As shown in FIG. 8C, the call details interface 870 includes a first graphical element 871C of "Assisted Call, Hypothetical Hotel", a second graphical element 872C of "Regular Call", and a third graphical element 873C of "Save Contact 'Hypothetical Hotel'". The graphical elements of FIG. 8C may also include sub-elements that correspond to candidate states that are associated with an IVR tree that is associated with the Hypothetical Hotel. For example, and as shown in FIG. 8C, the first graphical element 871C can include a first sub-element 871C1 of "Change Reservation" associated with a target state of navigating the IVR tree associated with the Hypothetical Hotel to a portion that corresponds to changing hotel reservations, a second sub-element 871C2 of "Request Free Upgrade" associated with a target state of navigating the IVR tree associated with the Hypothetical Hotel to a portion that corresponds to requesting a free upgrade for an existing hotel reservation, and a third sub-element 871C3 of "Concierge Direct Line" associated with a target state of navigating the IVR tree associated with the Hypothetical Hotel to a portion that corresponds to contacting a concierge of Hypothetical Hotel.

In contrast, and as shown in FIG. 8D, the call details interface 870 includes a first graphical element 871D of "Assisted Call, Example Hotel" (as opposed to "Hypothetical Hotel" in FIG. 8C), a second graphical element 872D of "Regular Call", and a third graphical element 873D of "Save Contact 'Example Hotel'". The graphical elements of FIG. 8D may also include sub-elements that correspond to candidate states that are associated with an IVR tree that is associated with the Example Hotel. For example, and as shown in FIG. 8D, the first graphical element 871D can include a first sub-element 871D1 of "Change Reservation" associated with a target state of navigating the IVR tree associated with the Example Hotel to a portion that corresponds to changing hotel reservations, a second sub-element 871D2 of "Cancel Reservation" associated with a target state of navigating the IVR tree associated with the Example Hotel to a portion that corresponds to cancelling an existing hotel reservation, and a third sub-element 871D3 of "Front Desk" associated with a target state of navigating the IVR tree associated with the Hypothetical Hotel to a portion that corresponds to contacting a front desk at Example Hotel.

Notably, the difference in the candidate states included in FIGS. 8C and 8D may be based on contextual information associated with the given user of the client device 110 of the given user. Notably, and with respect to FIG. 8C, the automated assistant has access to a user account of the given user of the client device 110 that is associated with Hypothetical Hotel. For example, the automated assistant can access a user account status (e.g., bronze member, silver member, gold member, and so on), a user account number, a user account history that includes stays at various locations of the Hypothetical Hotel, and so on. For the sake of example, assume the given user of the client device 110 is a gold member of Hypothetical Hotel. As a result, candidate states associated with the selectable sub-elements 871C2 and 871C3 may be available based on the gold member status of the given user of the client device 110. In contrast, and with respect to FIG. 8D, the automated assistant may not have any record of a user account that is associated with Example Hotel. As a result, candidate states associated with the selectable sub-elements 871C2 and 871C3 may not be available, but the automated assistant may still be able to navigate to various candidate states depicted in FIG. 8D. Accordingly, the IVR tree may be dynamic in that some of the candidate states may be available in a given context, whereas other candidate states may not be available in the given context.

Although FIGS. 8A and 8B are described herein with respect to availability of candidate states based on contextual information that is associated with the client device 110 of the given user, and FIGS. 8C and 8D are described herein with respect to availability of candidate states based on contextual information associated with the given user of the client device 110, it should be understood that is for the sake of example and is not meant to be limiting. For example, the availability of the candidate states can be based on both contextual information that is associated with the client device 110 of the given user and contextual information associated with the given user of the client device 110. For instance, and with respect to FIG. 8C, if the given user of the client device 110 initiates the assisted telephone call when the concierge of the Hypothetical Hotel is not working, the candidate state associated with the third sub-element 871C3 of "Concierge Direct Line" may be omitted even though the user account status of the user account associated with Hypothetical Hotel enables the given user of the client device 110 to directly contact the concierge of Hypothetical Hotel.

Moreover, although FIGS. 8A-8D are described herein with respect to certain entities, and certain graphical elements are depicted along with the search results and the call details interface, it should be understood that is for the sake of example and is not meant to be limiting. It should be understood an IVR tree that is associated with any entity that employs an IVR system can be stored, and subsequently utilized in performing assisted telephone calls. Further, it should be understood that graphical elements and information provided by the automated assistant may be based on the IVR tree, and that the configurations of the IVR tree that is associated with the entity are virtually limitless.

Figure 9:
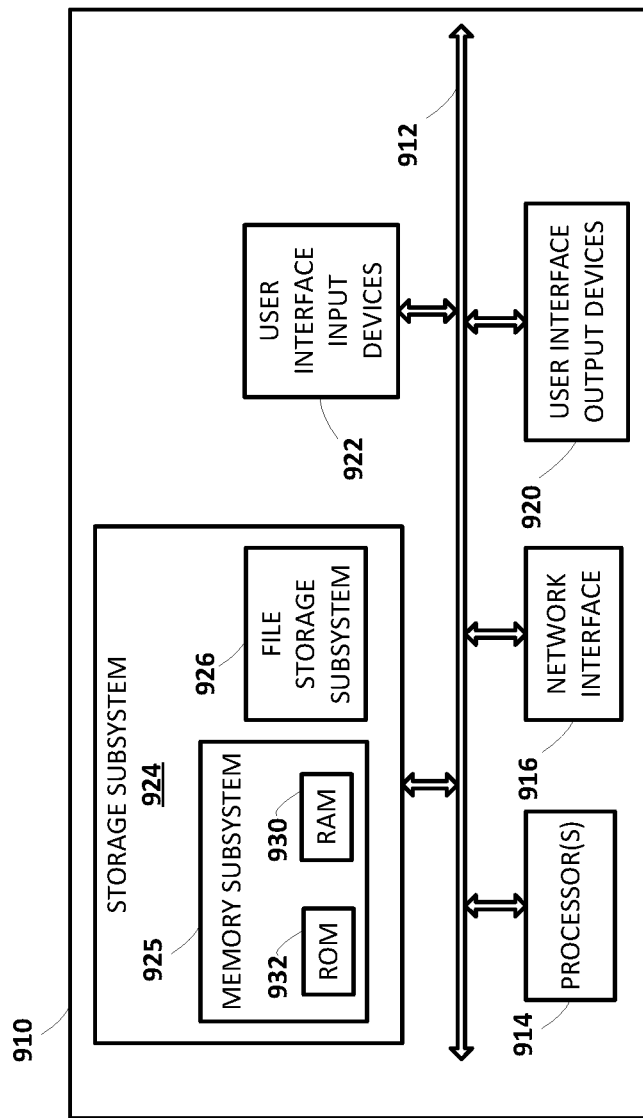
FIG. 9 depicts an example architecture of a computing device, in accordance with various implementations.

FIG. 9 is a block diagram of an example computing device 910 that may optionally be utilized to perform one or more aspects of techniques described herein. In some implementations, one or more of a client device, cloud-based automated assistant component(s), and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods disclosed herein, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem 912 may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a given user and via a client device associated with the given user, user input to initiate an assisted telephone call; identifying, based on the user input, an entity to engage with, on behalf of the given user, during the assisted telephone call; identifying an interactive voice response (IVR) tree that is associated with the identified entity, the IVR tree including a plurality of candidate states; determining, based on the user input or additional user input, a target state of the IVR tree from among the plurality of candidate states; and initiating performance of the assisted telephone call to navigate the IVR tree to the target state. performance of the assisted telephone call comprises automatically navigating the assisted telephone call to the target state of the IVR tree. The method further includes, during performance of the assisted telephone call, and while the IVR tree is being navigated to the target state, detecting at least one user interaction that is directed to the client device and that is associated with the identified entity, and generating, based on the at least one user interaction directed to the client device, one or more prompts related to modifying navigation of the IVR tree. The method further includes, in response to determining that further additional user input, received responsive to rendering one or more of the additional prompts, modifies navigation of the IVR tree, modifying performance of the assisted telephone call based on the further additional user input.

These and other implementations of technology disclosed herein can optionally include one or more of the following features.

In some implementations, the method may further include, subsequent to navigating the IVR tree to arrive at a particular state during the assisted telephone call, and based on the further additional user input, generating a notification that requests the given user associated with the client device joins the assisted telephone call, and causing the notification to be rendered at the client device associated with the given user. In some versions of those implementations, causing the notification to be rendered at the client device associated with the given user may include one or more of: causing the client device to vibrate, causing the client device to audibly render the notification that requests the given user joins the assisted telephone call, or causing the client device to visually render the notification that requests the given user joins the assisted telephone call. In some additional or alternative versions of those implementations, the method may further include, subsequent to navigating the IVR tree to the particular state, engaging in a conversation with a human representative that is associated with the identified entity to verify whether the particular state corresponds to the target state.

In some further versions of those implementations, engaging in the conversation with the human representative to verify whether the particular state corresponds to the target state may include processing, using a speech recognition model, audio data that captures a spoken utterance of the human representative; and determining, based on processing the audio data, whether the human representative verifies the particular state corresponds to the target state. Generating the notification that requests the given user associated with the client device joins the assisted telephone call may be in response to determining that the human representative verifying that the particular state corresponds to the target state. In yet further versions of those implementations may further include causing synthesized speech audio data that includes synthesized speech for verifying whether the IVR tree was successfully navigated to be rendered at an additional client device associated with the human representative. The audio data that captures the spoken utterance of the human representative may be received in response to the synthesized speech audio data being rendered at the additional client device associated with the human representative.

In some further additional or alternative versions of those implementations, the method may further include, in response to determining that the human representative indicating that the particular state does not correspond to the target state, causing further synthesized speech audio data that includes further synthesized speech to request the assisted telephone call be transferred to another human representative that is associated with the identified entity to be rendered at an additional client device associated with the human representative.

In some implementations, the method may further include identifying, based on the user input or the additional user input, a task to be performed, on behalf of the given user, and during the assisted telephone call; and subsequent to navigating the IVR tree to the target state, and during the assisted telephone call: engaging in a conversation with a human representative that is associated with the identified entity to complete the task on behalf of the given user. Engaging in the conversation with the human representative may include causing synthesized speech audio data that includes synthesized speech for completing the task to be rendered at an additional client device associated with the human representative, processing, using a speech recognition model, audio data that captures a spoken utterance of the human representative, and that is received responsive to rendering of the synthesized speech, and determining, based on processing the audio data, a result associated with performance of the task. In some versions of those implementations, the method may further include generating a notification based on the result associated with performance of the task; and causing the notification to be rendered at the client device associated with the given user.

In some implementations, the method may further include, in response to determining that the further additional user input, received responsive to rendering one or more of the additional prompts, does not modify navigation of the IVR tree, continuing performance of the assisted telephone call to navigate the IVR tree to the target state.

In some implementations, the method may further include, in response to identifying the IVR tree that is associated with the identified entity, obtaining one or more prompts related to navigating the IVR tree that is associated with the identified entity, and causing one or more of the prompts to be rendered at the client device associated with the given user. The additional user input may be received responsive to one or more of the prompts being rendered.

In some implementations, the at least one user interaction at the client device associated with the given user may include one or more of: a search interaction at the client device that is associated with the identified entity, a browsing interaction at the client device that is associated with the identified entity, or a navigation interaction at the client device that is associated with the identified entity.

In some implementations, automatically navigating the assisted telephone call to the target state of the IVR tree may include one or more of: determining one or more values associated with corresponding parameters for navigating the IVR tree based on the user input or the additional user input. In some versions of those implementations, modifying the navigation of the IVR may include determining, based on the user interaction or the further additional user input, an alternate target state of the IVR tree. Modified performance of the assisted telephone call may include automatically navigating the assisted telephone call to the alternate target state of the IVR tree based on one or more of the values associated with the corresponding parameters. In some further versions of those implementations, modifying the navigation of the IVR may include determining, based on the user interaction or the further additional user input, one or more alternate target state of the IVR tree. Modified performance of the assisted telephone call may include automatically navigating the assisted telephone call to the target state of the IVR tree based on one or more alternate values associated with the corresponding parameters.

In some implementations, automatically navigating the assisted telephone call to the target state of the IVR tree may include one or more of: emulating one or more button presses to be rendered at an additional client device associated with the identified entity to automatically navigate the IVR tree until arriving at the target state, causing synthesized speech audio data that includes synthesized speech to be rendered at an additional client device associated with the identified entity to automatically navigate the IVR tree until arriving at the target state, or causing audio data that captures a spoken utterance of the given user associated with the client device to be rendered at an additional client device associated with the identified entity.

In some implementations, a method implemented by one or more processors is provided, and includes receiving, from a given user and via a search interface of a client device associated with the given user, user input; issuing, at the search interface of the client device, a search query based on the user input; identifying, based on the issued search query, a given search result that is associated with an entity to engage with, on behalf of the given user, during an assisted telephone call, the given search result being associated with a target state, from among a plurality of candidate states, for an interactive voice response (IVR) tree that is associated with the identified entity; causing at least the given search result to be rendered at the search interface of the client device; in response to the given search result being rendered at the search interface of the client device, receiving, from the given user and via the search interface of the client device, a selection of the given search result; and in response to receiving the selection of the given search result, initiating performance of the assisted telephone call. Performance of the assisted telephone call includes automatically navigating the assisted telephone call to the target state of the IVR tree.

These and other implementations of technology disclosed herein can optionally include one or more of the following features.

In some implementations, the method may further include identifying, based on the issued search query, an additional given search result that is associated with the entity, the additional given search result being associated with an additional target state, of the plurality of candidate states, for the IVR tree. In some versions of those implementations, the method may further include causing the additional given search result to be rendered along with the given search result. In some further versions of those implementations, causing the additional given search result to be rendered along with the given search result may include rendering the given search result more prominently than the additional given search result.

In yet further versions of those implementations, rendering the given search result more prominently than the additional given search result may include rendering the given search result more prominently than the additional given search result based on a recent user interaction, of the given user, with the client device. In even further versions of those implementations, the recent user interaction, of the given user, with the client device may include the given user accessing content that is associated with the given search result. In yet further additional or alternative versions of those implementations, rendering the given search result more prominently than the additional given search result may include rendering the given search result more prominently than the additional given search result based on popularity of the given search result. In even further versions of those implementations, the popularity of the given search result may be based on a click-through rate, of a plurality of users that are in addition to the given user, that is associated with the given search result.

In some implementations, a method implemented by one or more processors is provided, and includes receiving, from a given user and via a client device associated with the given user, user input to initiate an assisted telephone call; identifying, based on the user input, an entity to engage with, on behalf of the given user, during the assisted telephone call; identifying an interactive voice response (IVR) tree that is associated with the identified entity, the IVR tree including a plurality of candidate states; determining, based on contextual information associated with the client device or the given user associated with the client device, availability of the plurality of candidate states as a target state of the IVR tree; and determining, based on the user input or additional user input, the target state of the IVR tree from among the plurality of candidate states that are available; and initiating performance of the assisted telephone call to navigate the IVR tree to the target state. Performance of the assisted telephone call includes automatically navigating the assisted telephone call to the target state of the IVR tree.

These and other implementations of technology disclosed herein can optionally include one or more of the following features.

In some implementations, the contextual information may be associated with the client device, and the contextual information may include one or more of: a current location of the client device, a current time at the current location of the client device, or a current day at the current location of the client device. In some versions of those implementations, the given IVR tree that is selected from among the plurality of disparate IVR trees may be based on one or more of: the current location of the client device, or the current time at the current location of the client device.

In some implementations, the contextual information may be associated with the given user associated with the client device, and the contextual information may include one or more of: electronic communications created at the client device or received at the client device, user account information associated with a user account of the given user, or pecuniary information associated with the given user. In some versions of those implementations, the given IVR tree that is selected from among the plurality of disparate IVR trees may be based on one or more of: the electronic communications created at the client device or received at the client device, the user account information associated with the user account of the given user, or the pecuniary information associated with the given user.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving, from a given user and via a search interface of a client device associated with the given user, user input;
   issuing, at the search interface of the client device, a search query based on the user input;
   identifying, based on the issued search query:
      a given search result that is associated with an entity to be subsequently engaged with, on behalf of the given user, during performance of an assisted telephone call, the given search result being associated with a deeplink to an interactive voice response (IVR) target state, from among a plurality of candidate IVR states, of a telephonic IVR tree that is associated with the identified entity, and
      an additional given search result that is associated with the entity, the additional given search result being associated with an additional deeplink to an additional IVR target state, of the plurality of candidate IVR states, for the telephonic IVR tree;
   causing at least the given search result and the additional given search result to be rendered at the search interface of the client device, wherein causing at least the given search result and the additional given search result to be rendered at the search interface of the client device comprises:
      determining, based on one or more terms of the search query, that the given search result is more relevant to the search query than the additional given search result; and
      rendering, based on determining that the given search result is more relevant to the search query than the additional given search result, the given search result more prominently than the additional given search result;
   in response to the given search result being rendered at the search interface of the client device, receiving, from the given user and via the search interface of the client device, a selection of the deeplink to the IVR target state that is associated with the given search result; and
   in response to receiving the selection of the deeplink to the IVR target state that is associated with the given search result, initiating performance of the assisted telephone call with the identified entity, wherein performance of the assisted telephone call comprises automatically navigating, on behalf of the given user, the assisted telephone call to the IVR target state of the telephonic IVR tree.

2. The method of claim 1, wherein determining that the given search result is more relevant to the search query is further based on a recent user interaction, of the given user, with the client device.

3. The method of claim 2, wherein the recent user interaction, of the given user, with the client device includes the given user accessing content that is associated with the given search result.

4. The method of claim 1, wherein determining that the given search result is more relevant to the search query is further based on popularity of the given search result.

5. The method of claim 4, wherein the popularity of the given search result is based on a click-through rate, of a plurality of users that are in addition to the given user, that is associated with the given search result.

6. The method of claim 1, wherein automatically navigating the assisted telephone call to the IVR target state of the telephonic IVR tree comprises:
   emulating, on behalf of the given user, one or more corresponding instances of button presses to navigate the assisted telephone call to the IVR target state of the telephonic IVR tree; or
   rendering, on behalf of the given user, one or more corresponding instances of synthesized speech to navigate the assisted telephone call to the IVR target state of the telephonic IVR tree.

7. A system comprising:
   at least one processor; and
   memory storing instructions that, when executed, cause the at least one processor to:
      receive, from a given user and via a search interface of a client device associated with the given user, user input;
      issue, at the search interface of the client device, a search query based on the user input;
      identify, based on the issued search query:
         a given search result that is associated with an entity to be subsequently engaged with, on behalf of the given user, during performance of an assisted telephone call, the given search result being associated with a deeplink to an interactive voice response (IVR) target state, from among a plurality of candidate IVR states, of a telephonic IVR tree that is associated with the identified entity, and
         an additional given search result that is associated with the entity, the additional given search result being associated with an additional deeplink to an additional IVR target state, of the plurality of candidate IVR states, for the telephonic IVR tree;
      cause at least the given search result and the additional given search result to be rendered at the search interface of the client device, wherein the instructions to cause at least the given search result and the additional given search result to be rendered at the search interface of the client device comprise instructions to:
         determine, based on one or more terms of the search query, that the given search result is more relevant to the search query than the additional given search result; and
         render, based on determining that the given search result is more relevant to the search query than the additional given search result, the given search result more prominently than the additional given search result;
      in response to the given search result being rendered at the search interface of the client device, receive, from the given user and via the search interface of the client device, a selection of the deeplink to the IVR target state that is associated with the given search result; and
      in response to receiving the selection of the deeplink to the IVR target state that is associated with the given search result, initiate performance of the assisted telephone call with the identified entity, wherein the instructions to initiate performance of the assisted telephone call comprise instructions to automatically navigate, on behalf of the given user, the assisted telephone call to the IVR target state of the telephonic IVR tree.

8. The system of claim 7, wherein determining that the given search result is more relevant to the search query is further based on a recent user interaction, of the given user, with the client device.

9. The system of claim 8, wherein the recent user interaction, of the given user, with the client device includes the given user accessing content that is associated with the given search result.

10. The system of claim 7, wherein determining that the given search result is more relevant to the search query is further based on popularity of the given search result.

11. The system of claim 10, wherein the popularity of the given search result is based on a click-through rate, of a plurality of users that are in addition to the given user, that is associated with the given search result.

12. The system of claim 7, wherein the instructions to automatically navigating the assisted telephone call to the IVR target state of the telephonic IVR tree comprise instructions to:
   emulate, on behalf of the given user, one or more corresponding instances of button presses to navigate the assisted telephone call to the IVR target state of the telephonic IVR tree; or
   render, on behalf of the given user, one or more corresponding instances of synthesized speech to navigate the assisted telephone call to the IVR target state of the telephonic IVR tree.

13. A non-transitory computer-readable storage medium storing instructions that, when executed, cause at least one processor to perform operations, the operations comprising:
   receiving, from a given user and via a search interface of a client device associated with the given user, user input;
   issuing, at the search interface of the client device, a search query based on the user input;
   identifying, based on the issued search query:
      a given search result that is associated with an entity to be subsequently engaged with, on behalf of the given user, during performance of an assisted telephone call, the given search result being associated with a deeplink to an interactive voice response (IVR) target state, from among a plurality of candidate IVR states, of a telephonic IVR tree that is associated with the identified entity, and
      an additional given search result that is associated with the entity, the additional given search result being associated with an additional deeplink to an additional IVR target state, of the plurality of candidate IVR states, for the telephonic IVR tree;
   causing at least the given search result and the additional given search result to be rendered at the search interface of the client device, wherein causing at least the given search result and the additional given search result to be rendered at the search interface of the client device comprises:
      determining, based on one or more terms of the search query, that the given search result is more relevant to the search query than the additional given search result; and
      rendering, based on determining that the given search result is more relevant to the search query than the additional given search result, the given search result more prominently than the additional given search result;
   in response to the given search result being rendered at the search interface of the client device, receiving, from the given user and via the search interface of the client device, a selection of the deeplink to the IVR target state that is associated with the given search result; and
   in response to receiving the selection of the deeplink to the IVR target state that is associated with the given search result, initiating performance of the assisted telephone call with the identified entity, wherein performance of the assisted telephone call comprises automatically navigating, on behalf of the given user, the assisted telephone call to the IVR target state of the telephonic IVR tree.

14. The non-transitory computer-readable storage medium of claim 13, wherein the operations further comprise:
   emulating, on behalf of the given user, one or more corresponding instances of button presses to navigate the assisted telephone call to the IVR target state of the telephonic IVR tree; or
   rendering, on behalf of the given user, one or more corresponding instances of synthesized speech to navigate the assisted telephone call to the IVR target state of the telephonic IVR tree.

\* \* \* \* \*